(12) United States Patent  (10) Patent No.: US 8,465,250 B2
Johnsen et al.  (45) Date of Patent: Jun. 18, 2013

(54) PALLETIZING SYSTEM AND METHOD

(75) Inventors: Ole Johnsen, Campbellville (CA);
Wojciech Kowalczuk, Ancaster (CA);
Denis Trottier, Mississauga (CA)

(73) Assignee: Johnsen Machine Company, Ltd. (CN)

( * ) Notice: Subject to any disclaimer, the term of this patent is extended or adjusted under 35 U.S.C. 154(b) by 435 days.

(21) Appl. No.: 12/890,576

(22) Filed: Sep. 24, 2010

(65) Prior Publication Data

US 2011/0076128 A1   Mar. 31, 2011

Related U.S. Application Data

(60) Provisional application No. 61/245,928, filed on Sep. 25, 2009.

(51) Int. Cl.
*B65H 3/08* (2006.01)
*B65H 5/08* (2006.01)
*B65G 57/00* (2006.01)
*B65G 65/00* (2006.01)
*B65G 57/24* (2006.01)

(52) U.S. Cl.
USPC ........ 414/796.9; 414/797; 414/799; 414/927; 414/264

(58) Field of Classification Search
USPC ................... 271/107, 11, 165, 204, 264, 272, 271/3.07, 9.08, 91; 414/788, 788.1, 789.5, 414/791.6, 792.7, 793, 795.9, 796.2, 796.6, 414/796.9, 797, 798.2, 798.9, 799, 923, 927–929
See application file for complete search history.

(56) References Cited

U.S. PATENT DOCUMENTS

| 4,809,965 | A | * | 3/1989 | Vander Meer et al. | 271/11 |
| 4,993,907 | A | * | 2/1991 | Clark | 414/795.3 |
| 5,044,621 | A | * | 9/1991 | Sachs et al. | 271/11 |
| 5,184,153 | A | * | 2/1993 | Daniels et al. | 347/262 |
| 6,402,455 | B1 | * | 6/2002 | Vincent et al. | 414/789.5 |
| 6,658,816 | B1 | * | 12/2003 | Parker et al. | 53/397 |
| 7,802,959 | B2 | * | 9/2010 | Pierson et al. | 414/789.5 |

FOREIGN PATENT DOCUMENTS

FR   2573401 A1 * 5/1986

\* cited by examiner

*Primary Examiner* — Gregory Adams
(74) *Attorney, Agent, or Firm* — Steven Greenberg; Carey Rodiguez Greenberg O'Keefe, LLP

(57) ABSTRACT

A first layer of items is assembled on a movable conveyor belt on a support platform, and the conveyor belt advances to position the first layer of items above and in registration with a pallet while a second layer of items is assembled behind the first layer. The conveyor belt then stops, and part of the support platform and an associated portion of the conveyor belt retract from beneath the first layer of items, depositing the first layer of items on the pallet, after which the pallet is indexed downward. The retractable portion of the support platform and the associated portion of the conveyor belt then extend to the position above and in registration with the pallet, and the conveyor belt advances during this extension to position the second layer of items above and in registration with the pallet. Apparatus for placing slip sheets onto pallets is also described.

7 Claims, 38 Drawing Sheets

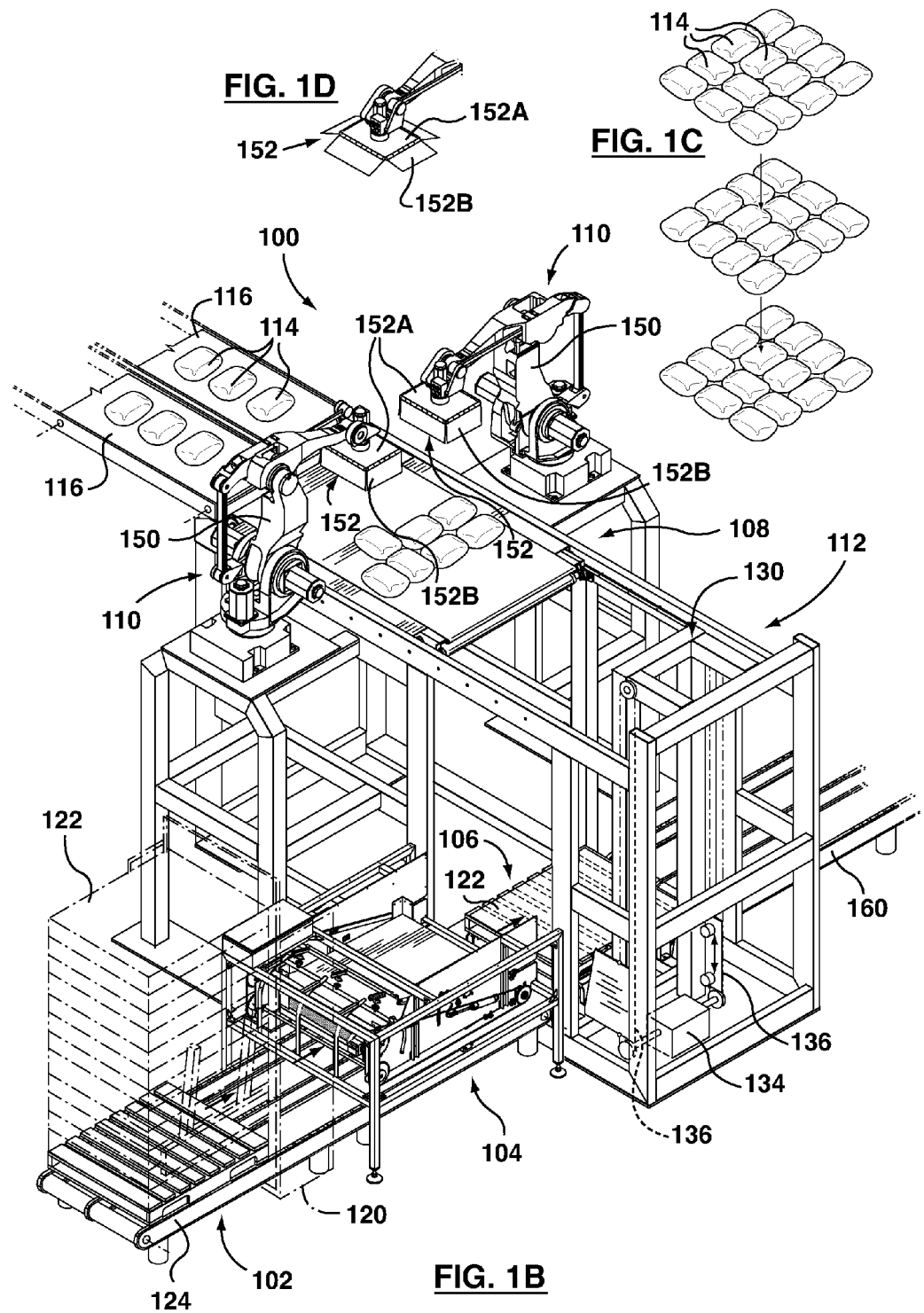

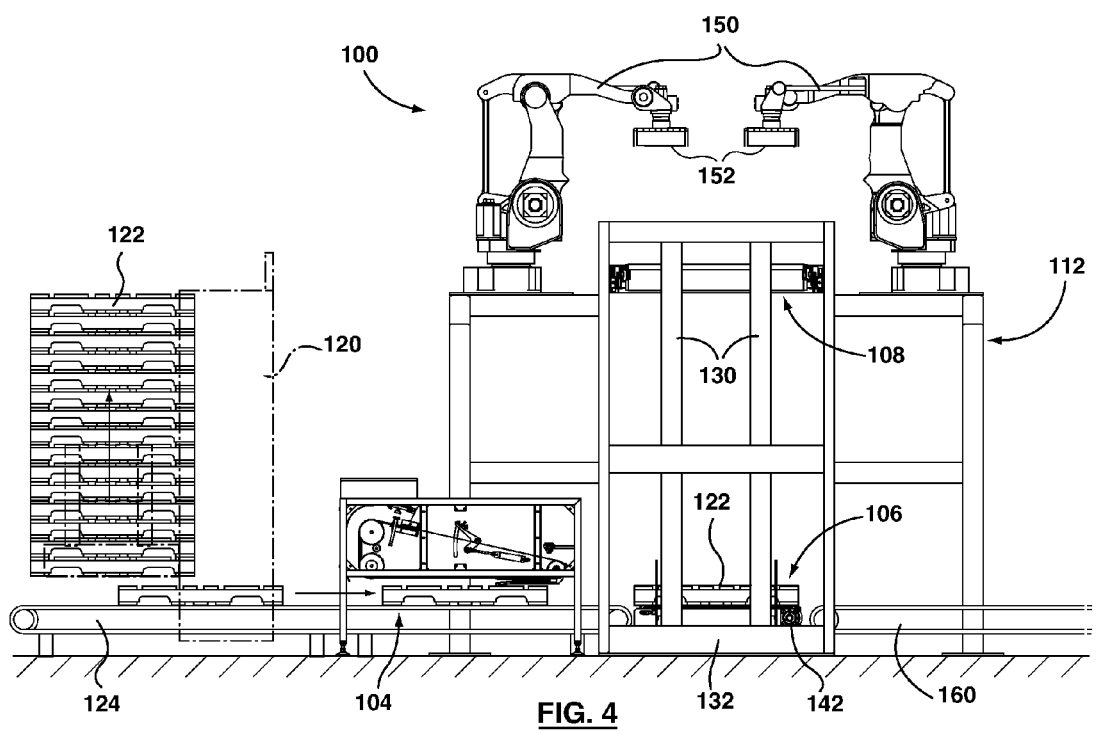

PALLETIZING SYSTEM AND METHOD

CROSS-REFERENCE TO RELATED APPLICATION

This application claims priority to U.S. Provisional Application No. 61/245,928 filed on Sep. 25, 2009, the teachings of which are hereby incorporated by reference.

FIELD OF INVENTION

The present invention relates to machines for use in packaging operations, and more particularly to palletizing systems and particular machines and mechanisms for use therein.

BACKGROUND OF THE INVENTION

In packaging operations, it is common to place multiple layers of items on top of a pallet.

Typically, a separation or cover sheet made of paper or another suitable material, known as a liner sheet or a "slip sheet", is placed on top of the pallet, underneath the first layer of product, in order to separate the product layer from the pallet. Since pallets are generally constructed from wood and reused, the slip sheet prevents splinters and other particles from coming in contact with the product and contaminating it. In addition, in some cases additional slip sheets may be placed between layers, or between groups of layers, to improve the stability of the stack of items on the pallet.

As can be imagined, the speed at which items can be stacked onto a pallet has a significant influence on productivity.

SUMMARY OF THE INVENTION

According to aspects of the present invention, a palletizing system is provided which can automatically stack individual items of known size and shape, such as boxes or filled bags, onto a pallet. In one embodiment, the system will receive an empty pallet, place a slip sheet on top of the pallet, stack the items onto the pallet and discharge the completed pallet, typically onto a conveyor, for further processing such as pick-up by a forklift or feeding into a stretch wrapping machine or other device.

In one aspect, the present invention is directed to a method for palletizing items. The method comprises assembling a first layer of items on a movable conveyor belt that is movable along a support platform, advancing the conveyor belt so that the first layer of items is disposed above and in registration with a pallet, and stopping the conveyor belt. Then, a retractable portion of the support platform and an associated portion of the conveyor belt are retracted from a position above and in registration with the pallet and beneath the first layer of items, so that the first layer of items is deposited on the pallet, after which the pallet is indexed downward by an amount at least equal to the height of the first layer. The retractable portion of the support platform and the associated portion of the conveyor belt are extended to the position above and in registration with the pallet after indexing the pallet downward. A second layer of items on the conveyor belt is assembled behind the first layer of items, and the conveyor belt is advanced while extending the retractable portion of the support platform and the associated portion of the conveyor belt to the position above and in registration with the pallet so that the second layer of items is disposed above and in registration with the pallet. The second layer of items is assembled at least while advancing the conveyor belt so that the first layer of items is disposed above and in registration with the pallet.

In one embodiment, the second layer of items is assembled while retracting the retractable portion of the support platform and the associated portion of the conveyor belt. In such an embodiment, assembling the second layer of items may also be carried out while indexing the pallet downward, and may be carried out while extending the retractable portion of the support platform and the associated portion of the conveyor belt.

In another aspect, the present invention is directed to a palletizing system. The palletizing system comprises a pallet elevator, an item-loading conveyor system, and at least one manipulator. The pallet elevator comprises an elevator support structure, an elevator platform movably carried by the elevator support structure to be vertically movable between a pallet transfer position and an upper position above the pallet transfer position, and an actuator coupled to the elevator platform and operable to raise the elevator platform from the pallet transfer position to the upper position and to lower the elevator platform from the upper position to the pallet transfer position by predetermined increments. The item-loading conveyor system comprises a conveyor platform assembly, a platform actuator, and a conveyor belt. The conveyor platform assembly comprises a stationary platform and a movable platform, the movable platform being horizontally movable between an extended position above the upper position of the elevator platform and substantially in registration with the elevator platform, and a retracted position underneath the stationary platform. The platform actuator is coupled to the movable platform and is operable to move the movable platform between the extended position and the retracted position. The conveyor belt is movably mounted to, loops around and is movable over an upper surface of the conveyor platform assembly to define a movable upper transport surface atop the conveyor platform assembly, and is arranged relative to the conveyor platform assembly so that the upper transport surface extends as far as does the movable platform of the conveyor platform. The upper transport surface is thereby able to continuously lengthen from a contracted configuration when the movable platform is in the retracted position to an expanded configuration extending substantially over the elevator platform when the movable platform is in the extended position. A conveyor belt drive is operable to advance the conveyor belt. The at least one manipulator is positioned to receive and arrange incoming items on at least that part of the upper transport surface disposed atop of the stationary platform.

In a further aspect, the present invention is directed to a method of transferring a top sheet from a stack of sheets to a pallet, with the stack of sheets contained in an elevated magazine positioned above and substantially in registration with the pallet. The method comprises lifting the top sheet from the stack of sheets, carrying the top sheet in an arcuate path around an edge of the magazine to a sheet placement position beneath the magazine and above the pallet, and releasing the top sheet onto the pallet in alignment therewith. In one embodiment of the method, the step of lifting the top sheet from the stack of sheets is carried out by a sheet lifting member, the step of carrying the top sheet in an arcuate path around an edge of the magazine to a position beneath the magazine and above the pallet is carried out by a sheet placement member, and the method further comprises a step of transferring the top sheet from the sheet lifting member to the sheet placement member after lifting the top sheet from the stack of sheets. In such a method, the step of lifting the top sheet from the stack of sheets may comprise moving the sheet lifting member from a sheet release position spaced from the top of the stack of sheets to a sheet capture position at the top of the stack of sheets, releasably securing the top sheet to the sheet lifting member, and moving the sheet lifting member to the sheet release position. The step of carrying the top sheet in an arcuate path around an edge of the magazine to the sheet placement position beneath the magazine and above the pallet may comprise releasably securing the top sheet to the sheet placement member and moving the sheet placement member to the sheet placement position from a sheet receiving position opposed to and beneath the sheet lifting member and the sheet when the sheet lifting member is in the sheet release position. In one embodiment, the step of releasably securing the top sheet to the sheet lifting member comprises releasably securing the top sheet to the sheet lifting member by suction, the step of releasably securing the top sheet to the sheet placement member comprises releasably securing the top sheet to the sheet placement member by suction, and the step of transferring the top sheet from the sheet lifting member to the sheet placement member after lifting the top sheet from the stack of sheets comprises activating suction on the sheet placement member and releasing suction on the sheet lifting member.

In a still further aspect, the present invention is directed to a sheet placement apparatus for placing sheets on a pallet. The sheet placement apparatus comprises a support structure, a sheet lifting mechanism carried by the support structure, and a sheet placement mechanism carried by the support structure. The support structure comprises a sheet stack magazine and a frame for elevating the magazine to define a pallet receiving region beneath the magazine. The sheet lifting mechanism includes a sheet lifting member movable to, when a stack of sheets is contained in the magazine, capture a top sheet on the stack of sheets, lift the sheet from the stack of sheets and release the sheet to the sheet placement mechanism, and a sheet lifting member actuator for moving the sheet lifting member. The sheet placement mechanism includes a sheet placement member movable to, when a stack of sheets is contained in the magazine, receive and capture the sheet from the sheet lifting member, carry the sheet in an arcuate path around an edge of the magazine to a position beneath the magazine and above the pallet receiving region, and, when a pallet is received in the pallet receiving region, release the sheet onto the pallet in alignment therewith, and also includes a sheet placement member actuator for moving the sheet placement member. The sheet lifting mechanism and the sheet placement mechanism cooperate to, when a stack of sheets is contained in the magazine and a pallet is received in the pallet receiving region, transfer the top sheet from the stack of sheets to the pallet.

In yet another aspect, the present invention is directed to a sheet placement apparatus for placing sheets on a pallet. The sheet placement apparatus comprises a support structure, a sheet lifting member and sheet lifting member actuator, and a sheet placement member and sheet placement member actuator. The support structure comprises a sheet stack magazine and a frame for elevating the magazine to define a pallet receiving region beneath the magazine. The sheet lifting member is movably mounted to the support structure to be movable between a sheet release position and a bottom sheet capture position through a range of intermediate sheet capture positions, and has a sheet lifting member capturer for releasably securing a sheet to the sheet lifting member. The sheet lifting member actuator is coupled to the sheet lifting member for controlling movement thereof. The sheet placement member is movably mounted to the support structure to be movable between a sheet receiving position opposed to and beneath the sheet lifting member when the sheet lifting member is in the sheet release position to a sheet placement position between the magazine and the pallet receiving region in which a sheet carried by the sheet placement member is aligned with the pallet receiving region, and sheet placement member has a sheet placement member capturer for releasably securing a sheet to the sheet placement member. The sheet placement member actuator is coupled to the sheet placement member for reciprocating the sheet placement member between the sheet receiving position and the sheet release position. The sheet lifting member, sheet lifting member actuator, sheet placement member and the sheet placement member actuator are cooperable to, when a stack of sheets is contained in the magazine and a pallet is received in the pallet receiving region, transfer the top sheet from the stack of sheets to the pallet.

In a still further aspect, the present invention is directed to a palletizer. The palletizer comprises a support frame, a stationary platform carried by the support frame and having a product entry end and a product exit end, and a movable platform movably carried by the support frame and substantially parallel to the stationary platform. The movable platform is movable along a linear path between a retracted position substantially beneath the stationary platform and an extended position in which the movable platform extends from the product exit end of the stationary platform. The movable platform has a distal end that is distal from the stationary platform when the movable platform is in the extended position, and a proximal end relative to the distal end. A platform drive is operable to extend and retract the movable platform. A fixed main conveyor roller is carried by the support frame adjacent the product entry end of the stationary platform, a fixed conveyor redirect roller is carried by the support frame adjacent the product exit end of the stationary platform, a movable conveyor return roller is carried by the movable platform adjacent the distal end thereof, and a movable conveyor redirect roller is carried by the movable platform adjacent the proximal end thereof and above the fixed conveyor redirect roller. The movable conveyor redirect roller is closer to the product entry end of the stationary platform than the fixed conveyor redirect roller for all positions of the movable platform relative to the stationary platform. The sum of the distance between the fixed main conveyor roller and the movable conveyor return roller and the distance between the movable conveyor redirect roller and the fixed conveyor redirect roller, each distance measured parallel to the linear path, is substantially constant for all positions of the movable platform relative to the stationary platform.

In one embodiment, a continuous loop conveyor belt is movable along the stationary platform and the movable platform parallel to the linear path, and a conveyor drive is operable to move the conveyor belt parallel to the linear path. The conveyor belt defines a loop passing, in a motion direction of the conveyer belt, from the main conveyor roller over top of the stationary platform and the movable platform, around the movable conveyor return roller and under an upper surface of the movable platform, to the movable conveyor redirect roller, to the fixed redirect roller, back to the main conveyor roller. The conveyor drive may comprise a motor drivingly coupled to the main conveyor roller.

In yet still a further aspect, the invention is directed to a method for palletizing items. The method comprises providing a continuous loop conveyor belt defining an upper transport surface, extending the upper transport surface to overlie a pallet in substantially parallel relation therewith, moving the conveyor belt to position a layer of items on the upper transport surface over top of the pallet, stopping the conveyor belt, and retracting the upper transport surface while the conveyor belt is stopped so that items carried on the upper transport surface fall off an edge of the upper transport surface as the upper transport surface retracts and the layer of items is deposited on the pallet. Preferably, the items in the layer of items are assembled in a predetermined pattern relative to one another on the upper transport surface, and the items in the layer of items remain in the predetermined pattern once deposited on the pallet.

BRIEF DESCRIPTION OF THE DRAWINGS

These and other features of the invention will become more apparent from the following description in which reference is made to the appended drawings wherein:

FIG. 1B is a perspective view of the palletizing system of FIG. 1, receiving items to be palletized;

FIG. 1C shows the relative position of items within layers to be palletized, according to an aspect of the present invention;

FIG. 1D shows an end-of-arm tool for a robotic arm in an open configuration;

FIG. 4 is a side view of the palletizing system of FIG. 1;

DETAILED DESCRIPTION

Figure 1A:
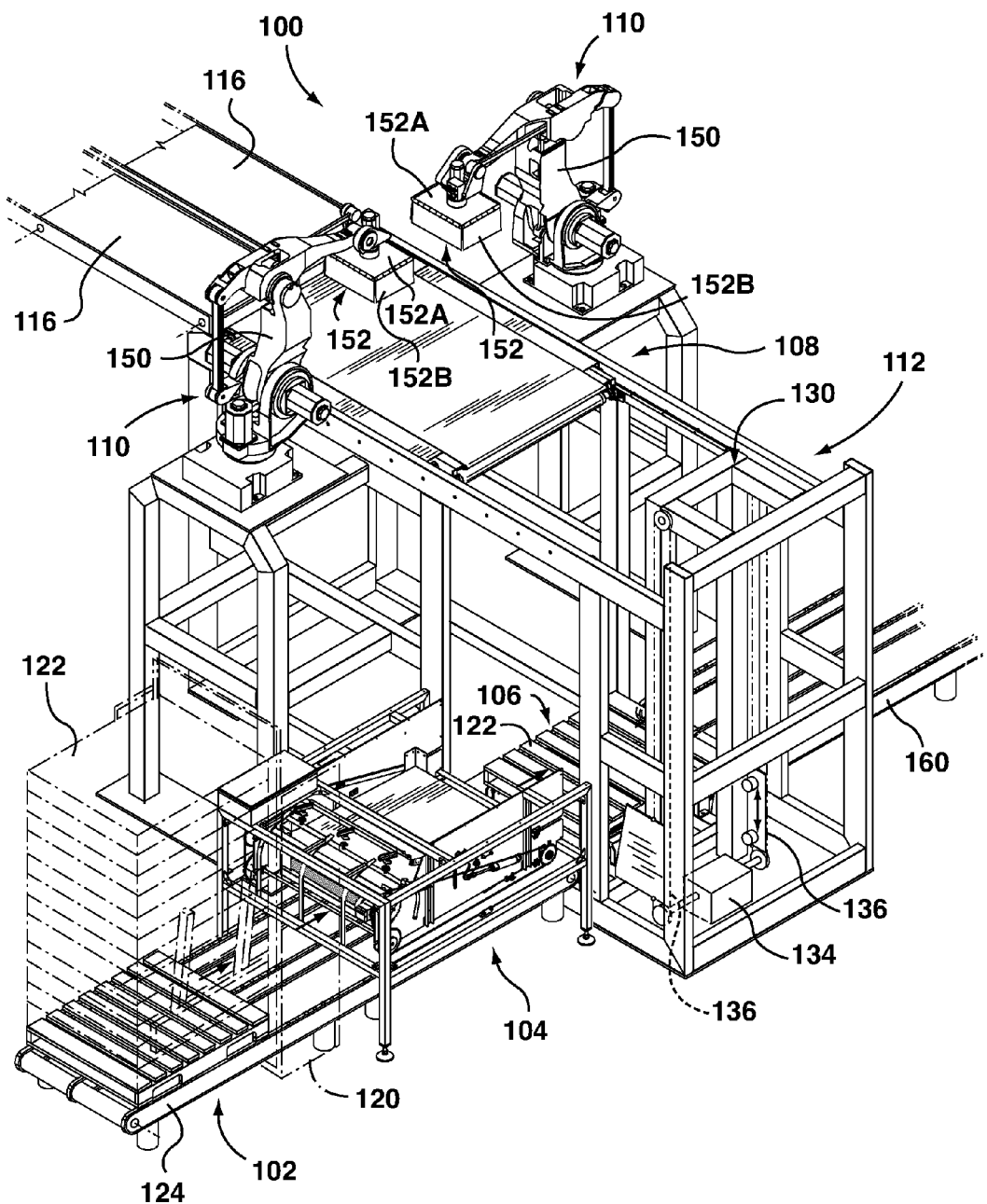
FIG. 1A is a perspective view of a first embodiment of a palletizing system according to aspects of the present invention.

With reference now to FIGS. 1A and 1B, 2A, 3 and 4, a first embodiment of a palletizing system according to aspects of the present invention is shown generally at 100. The palletizing system 100 comprises a pallet feeding system 102, a sheet placement machine 104, a pallet elevator 106, an item-loading conveyor system 108 and two manipulators 110. The pallet elevator 106, item-loading conveyor system 108 and manipulators 110 are carried by a primary frame 112.

The pallet feeding system 102 comprises an automatic pallet dispenser 120 and a pallet feeding conveyor 124 (comprising three parallel chains in the illustrated embodiment). The automatic pallet dispenser 120 has a stack of pallets 122 in a position elevated above the floor of the facility, and is able to release the bottom pallet onto the pallet feeding conveyor 124 while retaining the pallets 122 above. The automatic pallet dispenser 120 is typically loaded by adding pallets 122 to the stack of pallets 122 from above, for example by use of a forklift. In an exemplary embodiment, the automatic pallet dispenser may be one offered by Prime Conveyor, Inc., having an office at 8903 Louisiana Street, Merrillville, Ind. 46410, U.S.A. although other suitable automatic pallet dispensers may also be used. Once the automatic pallet dispenser 120 has released the bottom pallet 122 onto the pallet feeding conveyor 124, the pallet feeding conveyor 124 carries the released pallet 122 to the sheet placement machine 104. In particular, the pallet feeding conveyor 124 passes underneath the sheet placement machine 104, where the pallet stops so that the sheet placement machine 104 can deposit a slip sheet on top of the pallet 122. Construction and operation of the sheet placement machine 104 will be described in greater detail below. Optionally, once the pallet has received a slip sheet, the pallet feeding conveyor 124 may hold the pallet 122 in position underneath the sheet placement machine 104 while loading of an earlier pallet 122 is completed.

After the pallet 122 has received a sheet, the pallet feeding conveyor 124 carries the pallet 122 to the pallet elevator 106, where the pallet 122 is raised to the loading position.

In the illustrated embodiment, the pallet elevator 106 comprises an elevator support structure 130 secured to the primary frame 112, an elevator platform 132 (see FIGS. 4 and 6A to 6G) movably carried by the elevator support structure 130, and an actuator 134 coupled to the elevator platform and operable to raise and lower the elevator platform 132. In the illustrated embodiment, the actuator takes the form of a servo motor 134 coupled to the elevator platform by cables or chains 136. The elevator platform 132 is vertically movable along the elevator support structure 130 between a lowermost pallet transfer position, and an uppermost position. At the pallet transfer position, empty pallets 122 are loaded on, and full pallets 122 are unloaded from, the elevator support structure 130. To effect this loading and unloading, the elevator platform 132 has a live floor (see FIG. 6A) in the form of a short elevator chain conveyor 138 comprising three parallel loops of chain 138A supported by gear rollers 140 mounted the elevator platform 132 and driven by a motor 142. The elevator chain conveyor 138 can receive a pallet 122 from the pallet feeding conveyor 124 and position that pallet 122 in registration with the elevator platform 132, and can also move a full pallet 122 off the elevator platform 132 onto a waiting pallet exit conveyor 160 (also comprising a conveyor in the form of three parallel chains) positioned opposite the pallet feeding conveyor 124. The finished pallet, now outside the palletizing system 100, can be picked up by a forklift or carried by the pallet exit conveyor 160 for further handling. When the elevator platform 132 is in the pallet transfer position, the elevator conveyor belt 138 is in registration with both the pallet feeding conveyor 124 and the pallet exit conveyor 160.

Because (as will be explained in greater detail below) items are loaded onto the pallets 122 in layers, the actuator 134 can lower the elevator platform 132 from the upper position to the pallet transfer position by predetermined increments. These increments will generally be approximately equal to the height of one layer of items, thereby permitting another layer to be deposited on top of the layer below. While a particular exemplary structure for the pallet elevator 106 has been shown and described, any suitable elevator arrangement may be used without departing from the scope of the present invention.

Optionally, although not shown in the Figures, the elevator 106 may have walls surrounding the elevator platform 132 to define an interior elevator shaft. These walls may include a set of opposed movable walls which open to receive an empty pallet 122, and to permit discharge of a loaded pallet 122, which movable walls then close once the empty pallet 122 is positioned on the elevator platform 132, and thereby assist in positioning of the pallet 122 and the items 114 deposited thereon.

Items 114 to be palletized, which in the exemplary embodiment are filled bags, such as bags of ice or another type of product, are produced at a filling station (not shown) such as an ice bagging machine, from which location the items 114 are discharged onto individual transport conveyors (not shown). The items may also be, without limitation, boxes. The transport conveyors then bring the items 114 to a height above the height of the item-loading conveyor system 108, and hence above the height of the live floor of the elevator platform 132 when in the upper position, and discharge the items 114 onto an accelerating conveyor (not shown), where the items 114 are then accelerated and launched onto respective clam shell type gates (not shown), where they are aligned square to moving accumulation conveyors 116 running perpendicular to the accelerating conveyors. The items 114 are then individually dropped onto the respective accumulation conveyors 116 in a single row, in such a sequence as to provide proper spacing and singulation. The accumulation conveyors 116 feed the items 114 to the manipulators 110, which slide the items 114 onto the item-loading conveyor system 108. In particular, the accumulation conveyors 116 cause the items 114 to arrive with precise timing at a known predetermined location adjacent the item-loading conveyor system 108, for handling by the manipulators 110. Although the accumulation conveyors 116 are shown as being positioned parallel to the item-loading conveyor system 108, they may also be positioned perpendicularly thereto (e.g. see FIG. 20). Preferably, the accumulation conveyors 116 comprise conveyor belts running along a smooth upper surface.

In the illustrated embodiment, the manipulators 110 are model M-420iB robotic arms 150 offered by FANUC Robotics America, Inc., having an address at 3900 West Hamlin Rd., Rochester Hills, Mich. 48309-3253, U.S.A. These robotic arms 150 are four-axis, electro-servo driven and include an integrated mechanical and control unit. Other suitable robotic arms, or other suitable types of manipulators, may also be used, and in certain embodiments only one manipulator, or more than two manipulators, may be used. In the illustrated embodiment, both robotic arms 150 are operating simultaneously and in cooperation with one another, and are programmed to avoid collisions. The robotic arms 150 are positioned to receive incoming items 114 at the known predetermined location on the accumulation conveyors 116 and arrange these items 114 on at least that part of the upper transport surface 192 disposed atop of the stationary platform 162 by sliding the items along the upper transport surface 192.

The robotic arms 150 include an end-of-arm tool 152 comprising a generally planar rectangular central portion 152A and four generally planar rectangular side portions 152B drivably hinged to the central portion 152. The side portions 152B are movable between an open configuration, in which they are approximately parallel to and coplanar with the central portion 152A (see FIG. 1D) and a closed configuration (see FIG. 1B) in which the side portions 152B are approximately perpendicular to the central portion 152A and cooperate therewith to form an open-bottomed box. In the closed configuration, the end-of-arm tool 152 can trap either a single item, or a group of items, with suitable precision. Movement of the side portions 152B between the open and closed configuration is controlled by the same controller which controls that respective robotic arm 150.

In operation, as the robotic arm 150 moves to manipulate a particular item 114 (or group of items 114), the side portions 152B will be in the open configuration. The robotic arm 150 will then position the end-of-arm tool 152 immediately above the item 114 (or group of items 114), and then move the side portions 152B into the closed position, thereby trapping the item 114 (or group of items 114). Where the item 114 is a single bag, the end-of-arm tool 152 also helps to shape the bag. Once the side portions 152B are in the closed position with the item 114 (or group of items 114) trapped in the end-of-arm tool 152, the robotic arm 150 can then move the item 114 (or group of items 114) into a desired position on the item-loading conveyor system 108 by sliding it along the surface thereof, and possibly pivoting the item 114 (or group of items 114) as well. Once the item (or group of items 114) is in position, the robotic arm will move the end-of-arm tool 152 vertically upward until it is clear of the item 114 (or group of items 114), and then move the side portions 152B to the open configuration as the robotic arm 150 moves toward the pick-up position to retrieve another item 114 or group of items 114. In a preferred embodiment, the robotic arms 150 build layers continuously, or substantially continuously, while the palletizing system 100 is in operation.

Figure 5A:
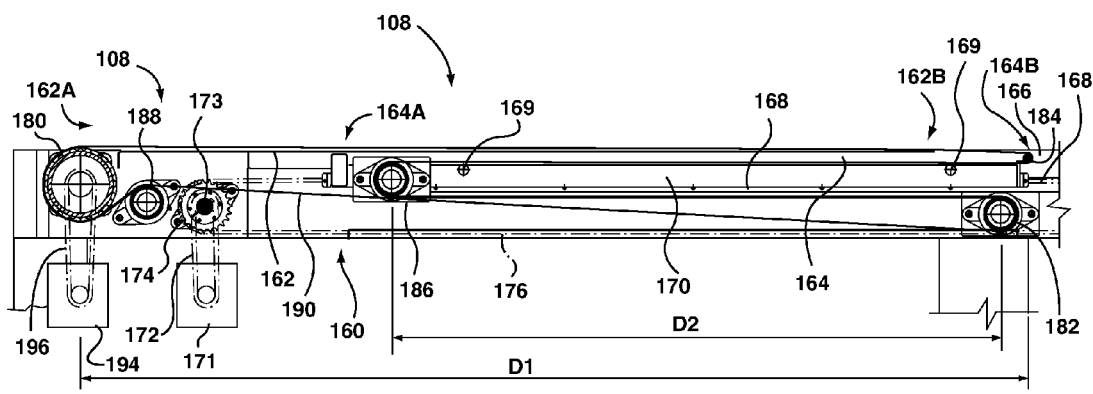
FIG. 5A is a cross-sectional view showing an item-loading conveyor system forming part of the palletizing system of FIG. 1 in a retracted configuration.
Figure 5B:
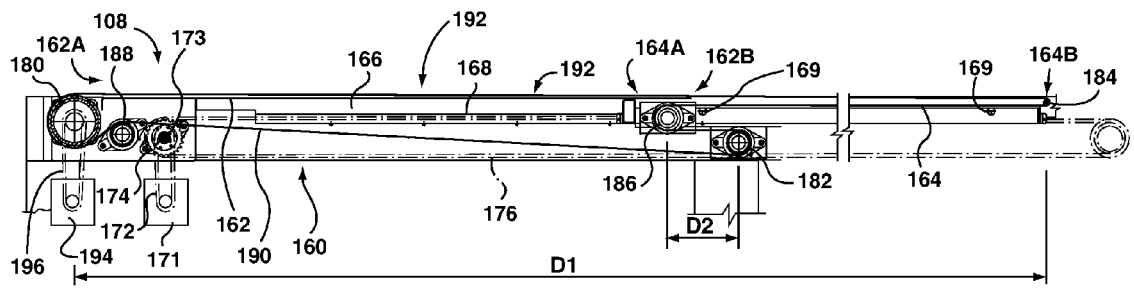
FIG. 5B shows the item-loading conveyor system of FIG. 5A in an extended configuration.
Figure 7:
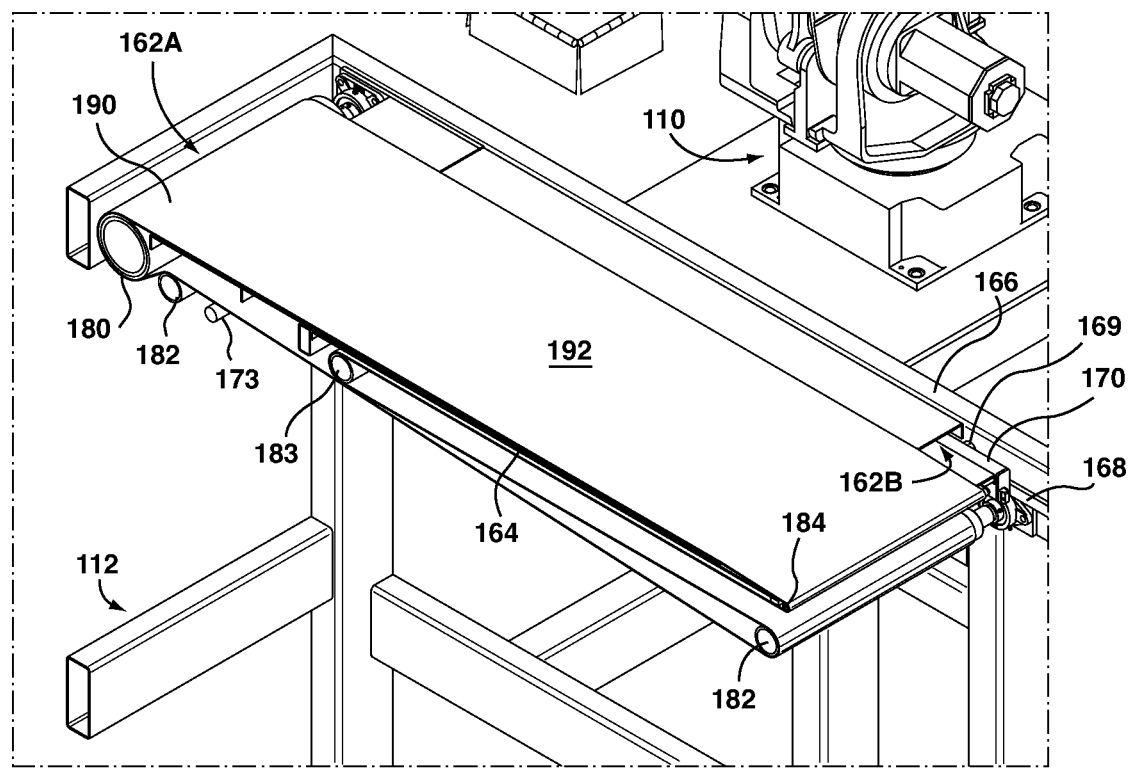
FIG. 7 is a cross-sectional perspective view of the item-loading conveyor system of FIG. 5A in a retracted configuration.
Figure 8:
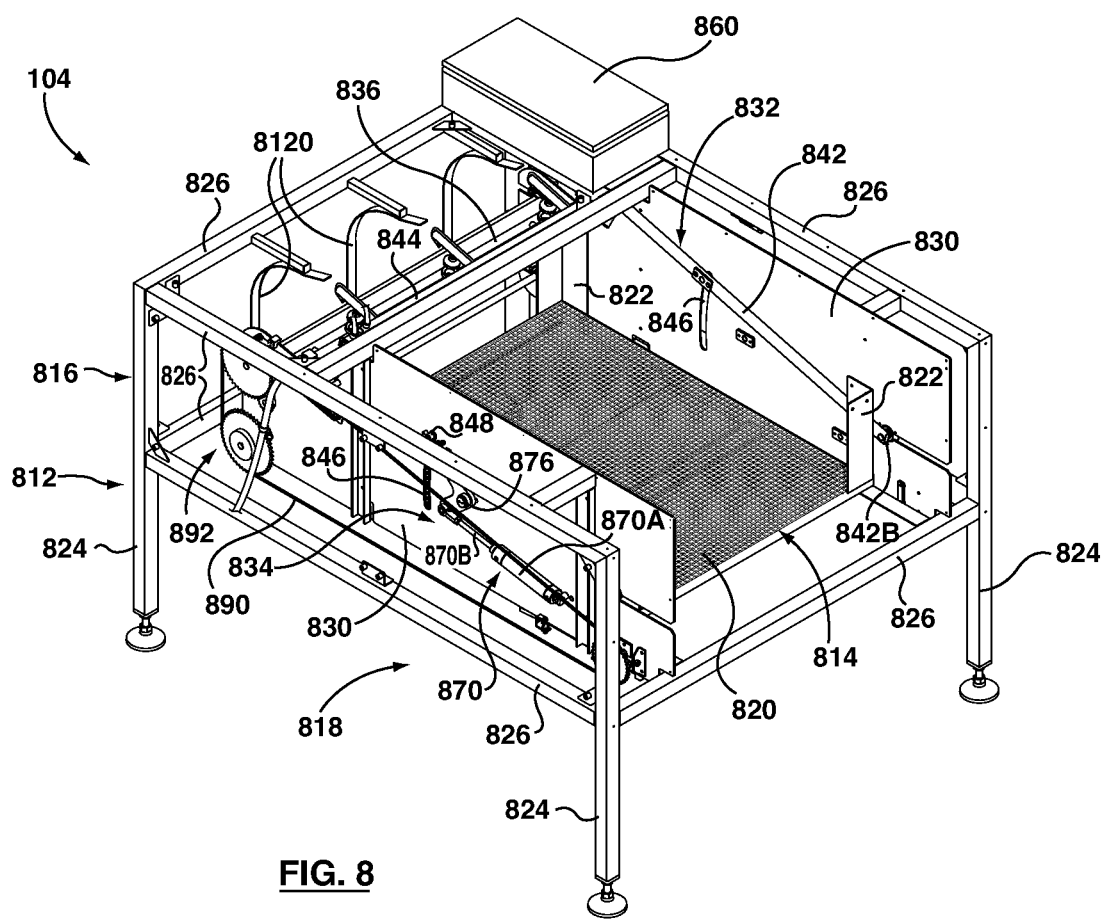
FIG. 8 is a first perspective view of an exemplary sheet placement machine, according to an aspect of the present invention.
Figure 9:
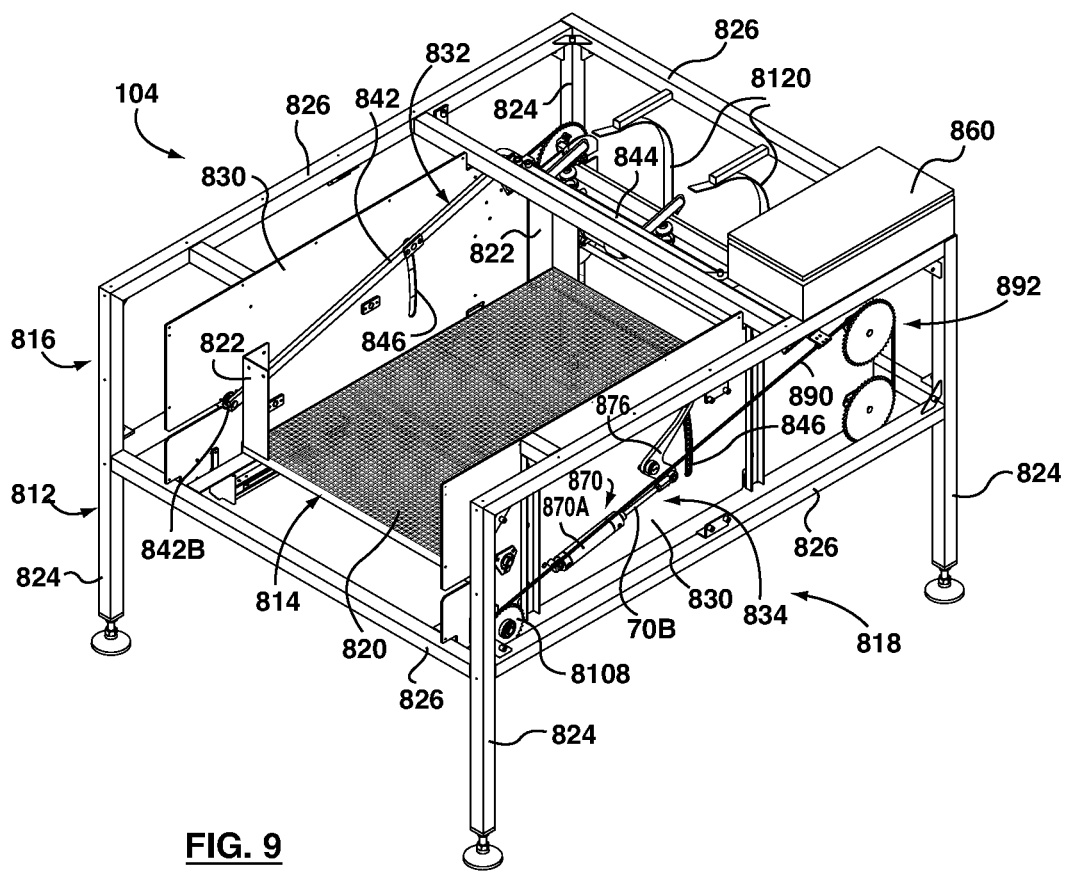
FIG. 9 is a second perspective view of the sheet placement machine of FIG. 8.

The item-loading conveyor system 108 will now be described, with particular reference to the cross-sectional views shown in FIGS. 5A, 5B and 7. The item-loading conveyor system 108 comprises a conveyor platform assembly 160, which includes a stationary platform 162 and a movable platform 164. The conveyor platform assembly 160, when in a fully extended configuration (as described below), is long enough to accommodate two layers of items 114 with each layer arranged end-to-end, spaced from one another. The stationary platform has a product entry end 162A and a product exit end 162B. The stationary platform 162 is fixedly mounted to two opposed beams 166 on the primary frame 112, and the movable platform 164 is slidably carried by two rails 168 extending along the inner surfaces of the two opposed beams 166. In particular, the movable platform 164 is mounted to two opposed longitudinally extending sliders 170 which slide along the rails 168 by way of rollers 169, so that the movable platform 164 is horizontally movable between an extended position and a retracted position. In the extended position, the combination of the movable platform 164 and the sliders 170 will straddle the pallet 122 or layer of items 114, with the pallet 122 or layer of items 114 disposed beneath the movable platform 164 and between the sliders 170.

Thus, the primary frame 112 serves as a support frame that fixedly carries the stationary platform 162 and movably carries the movable platform 164, with the movable platform 164 and the stationary platform 162 being substantially parallel to one another. As such, the movable platform 164 is movable along a linear path between the retracted position, where it is disposed substantially beneath the stationary platform 162, and the extended position in which the movable platform 164 extends from the product exit end 162B of the stationary platform 162, above the upper position of the elevator platform 132 and substantially in registration therewith. The movable platform 164 has a distal end 164B that is distal from the stationary platform 164 when the movable platform 162 is in the extended position, and a proximal end 164A relative to the distal end 164B.

A platform actuator in the form of a servo motor shown schematically at 171, is coupled to the movable platform 164 and operable to move the movable platform 164 between the extended position and the retracted position. In particular, the motor 171 is mechanically coupled through a suitable linkage shown schematically at 172 to a platform drive shaft 173 carrying a platform drive gear 174 at each end. Each platform drive gear 174 drives a respective chain 176 whose ends are secured to each end of one of the sliders 170. The motor 171, linkage 172, platform drive shaft 173, platform drive gears 174 and chains 176 thus form a platform drive operable to extend and retract the movable platform 164.

A fixed main conveyor roller 180 is carried by the primary frame 112, adjacent the product entry end 162A of the stationary platform 162, and a fixed conveyor redirect roller 182 is carried by the primary frame 112 adjacent the product exit end 162B of the stationary platform 162.

A movable conveyor return roller 184 is fixed to and carried by the movable platform 164 adjacent the distal end 164B thereof, and a movable conveyor redirect roller 186 is fixed to and carried by the movable platform 164 adjacent the proximal end 164A thereof. The terms "movable conveyor return roller" and "movable conveyor redirect roller" should be understood as referring to the fact that these rollers are mounted on the movable platform 164 and move with the movable platform; these rollers do not move linearly relative to the movable platform 164.

The movable conveyor redirect roller 186 is positioned with its center of rotation above the center of rotation of the fixed conveyor redirect roller 182, and its center of rotation is closer to the product entry end 162A of the stationary platform 162 than the center of rotation of the fixed conveyor redirect roller 182 for all positions of the movable platform 164 relative to the stationary platform 162. As such, and as best seen in FIGS. 5A and 5B (note that FIGS. 5A and 5B are not in the same scale), the sum of the distance D1 between the centers of rotation of the fixed main conveyor roller 180 and the movable conveyor return roller 184 and the distance D2 between the centers of rotation of the movable conveyor redirect roller 186 and the fixed conveyor redirect roller 182 is substantially constant for all positions of the movable platform 164 relative to the stationary platform 164. The distances D1 and D2 are measured parallel to the linear path of the movable platform 164.

A conveyor belt 190 is movably mounted to, loops around and is movable over an upper surface of the conveyor platform assembly 160 to define a movable upper transport surface 192 atop the conveyor platform assembly 160. More particularly, the conveyor belt 190 is movable along the stationary platform 162 and the movable platform 164 substantially parallel to the linear path along which the movable platform 164 is movable. The conveyor belt 190 is arranged relative to the conveyor platform assembly 160 so that the upper transport surface 192 extends as far as does the movable platform 164 of the conveyor platform. The upper transport surface 192 is thereby able to continuously lengthen from a contracted configuration terminating ahead of a pallet 122 on the elevator platform 132 when the movable platform 164 is in the retracted position (see FIG. 5A) to an expanded configuration extending substantially over the elevator platform 132 when the movable platform 164 is in the extended position (see FIG. 5B). The conveyor belt 190 takes the form of a continuous loop running (in the direction of motion of the conveyer belt 190), from the main conveyor roller 180 over top of the stationary platform 162 and the movable platform 164, around the movable conveyor return roller 184 and under an upper surface of the movable platform 164, to the movable conveyor redirect roller 186, to the fixed conveyor redirect roller 182, back to the main conveyor roller 180. A fixed repositioning roller 188 carried by the beams 166 adjusts the height of the conveyor belt 192 to provide improved traction at the main conveyor roller 180.

A servo motor shown schematically at 194 is mechanically coupled by a suitable linkage shown schematically at 196 to the main conveyor roller 180, so that the motor 194, linkage 196 and main conveyor roller 180 cooperate to form a conveyor belt drive operable to advance the conveyor belt 190. The servo motor 194, possibly in cooperation with other sensors, continuously feeds information about the position of the conveyor belt 190 to the manipulators 110, either directly or through a mediating controller. The manipulators 110 use the information about the position of the conveyor belt 190 to adjust the position of the items 114 on the upper transport surface 192 defined by the conveyor belt 190.

Figure 6A:
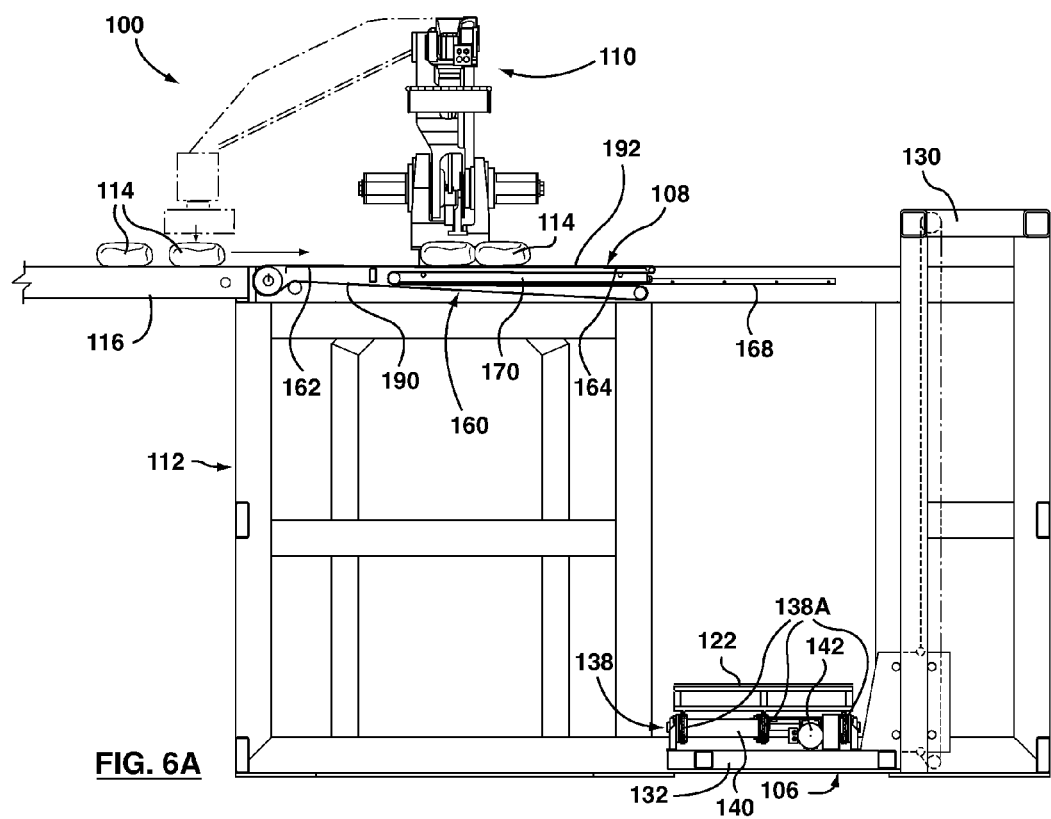
FIGS. 6A to 6G are simplified end cross-sectional views of the palletizing system of FIG. 1, showing a method of loading of items onto a pallet.

The exemplary palletizing system 100 enables a method for palletizing items, as shown in FIGS. 6A to 6G. According to this method, a continuous loop conveyor belt, such as the conveyor belt 190, is provided, which defines an upper transport surface, in this case the movable upper transport surface 192. FIG. 6A shows the palletizing system 100 in a start position, with a pallet 122 disposed on the elevator platform 132, which is in the lowermost pallet transfer position, and the manipulators 110 assembling a layer of items 114 on the upper transport surface 192 of the item-loading conveyor system 108.

Figure 6B:
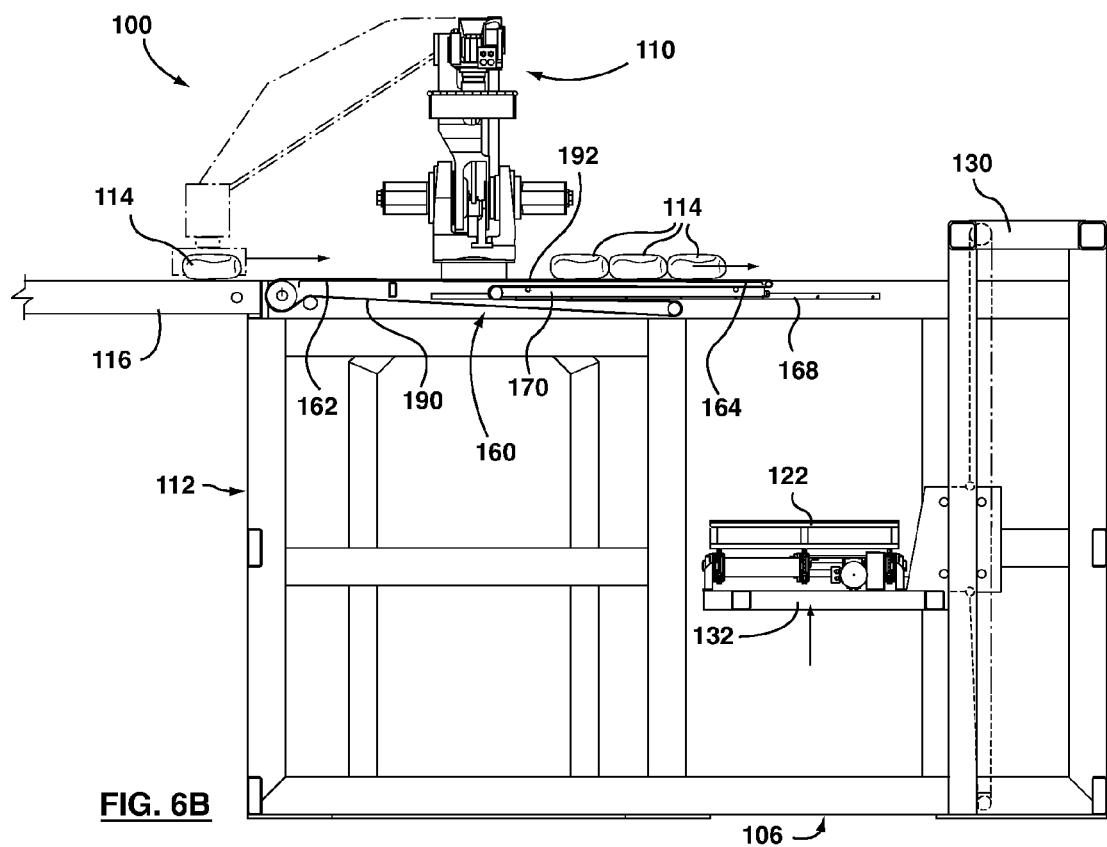
Figure 6C:
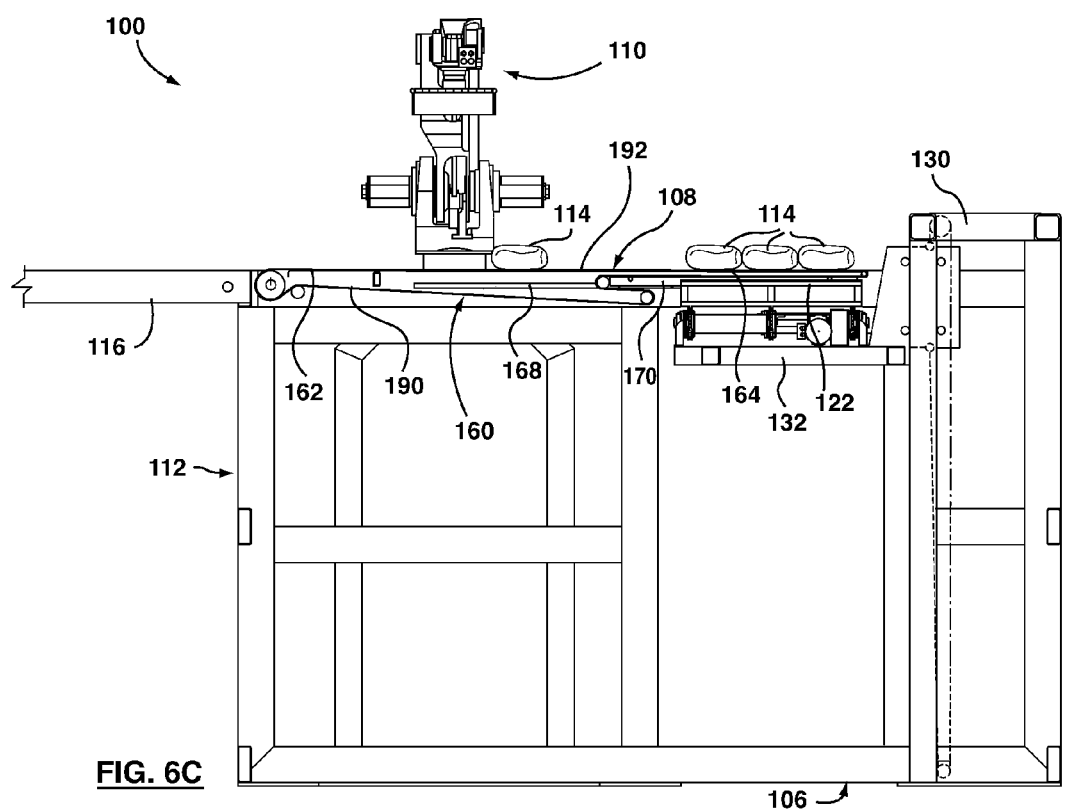
Figure 6D:
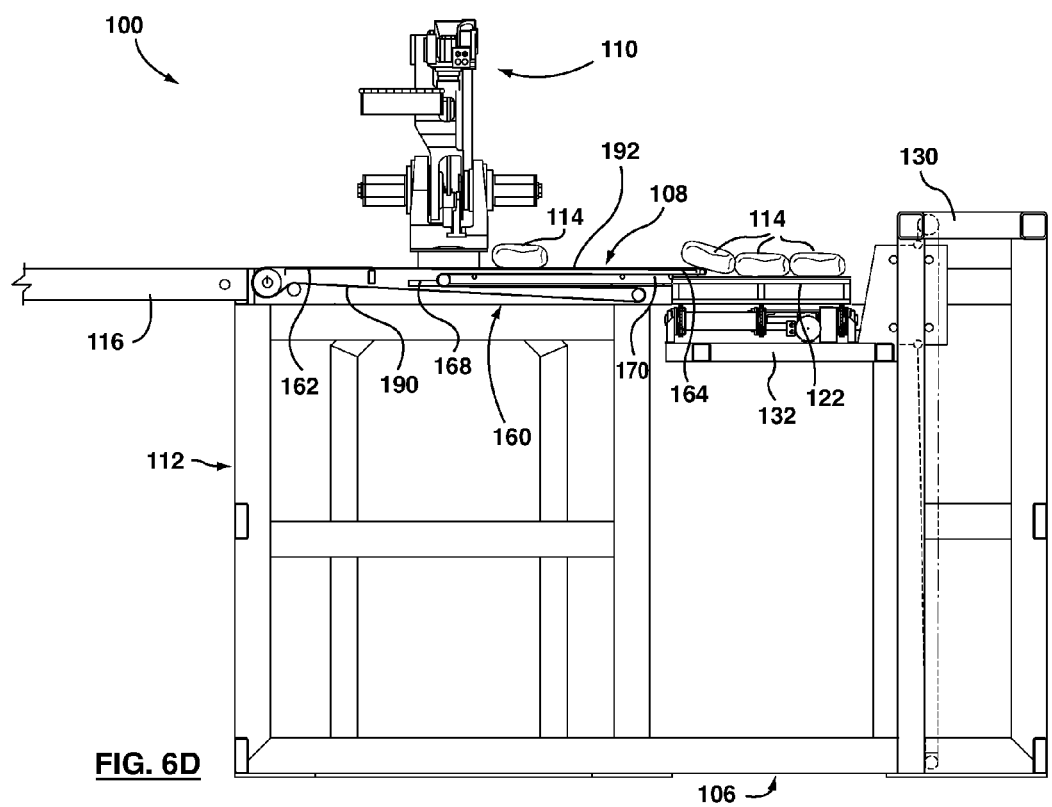
Figure 6E:
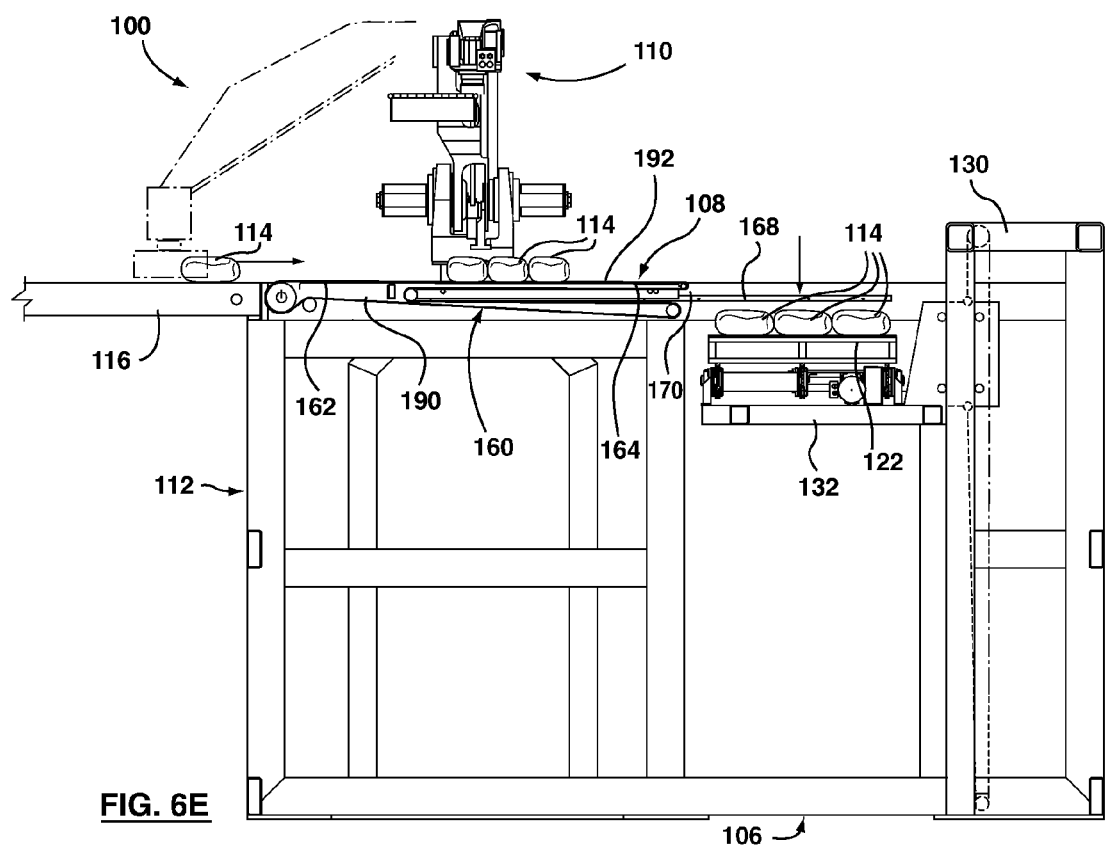

As shown in FIGS. 6B and 6C, the elevator platform 132 is raised to its upper position, which is generally done as fast as kinetically possible. Simultaneously, the upper transport surface 192 is extended to overlie the pallet 122 in substantially parallel relation therewith, and the conveyor belt 190 is moved to position a layer of items 114 on the upper transport surface 192 over top of the pallet 122. The conveyor belt 190 is then stopped and, as shown in FIG. 6D, the upper transport surface 192 is retracted while the conveyor belt 190 is stopped so that the items 114 carried on the upper transport 192 surface fall off the edge of the upper transport surface 114 as it retracts and the layer of items 114 is deposited on the pallet 122. As shown in FIG. 6E, the elevator platform 132 is lowered by an amount sufficient to allow the movable platform 164, along with the portion of the conveyor belt 190 passing thereunder, to extend over the layer of items 114 that was just deposited on the pallet 122. During retraction of the upper transport surface 192 and lowering of the elevator platform 132, the manipulators 110 are assembling another layer of items 114 on the upper transport surface 192.

Figures 2A, 2B:
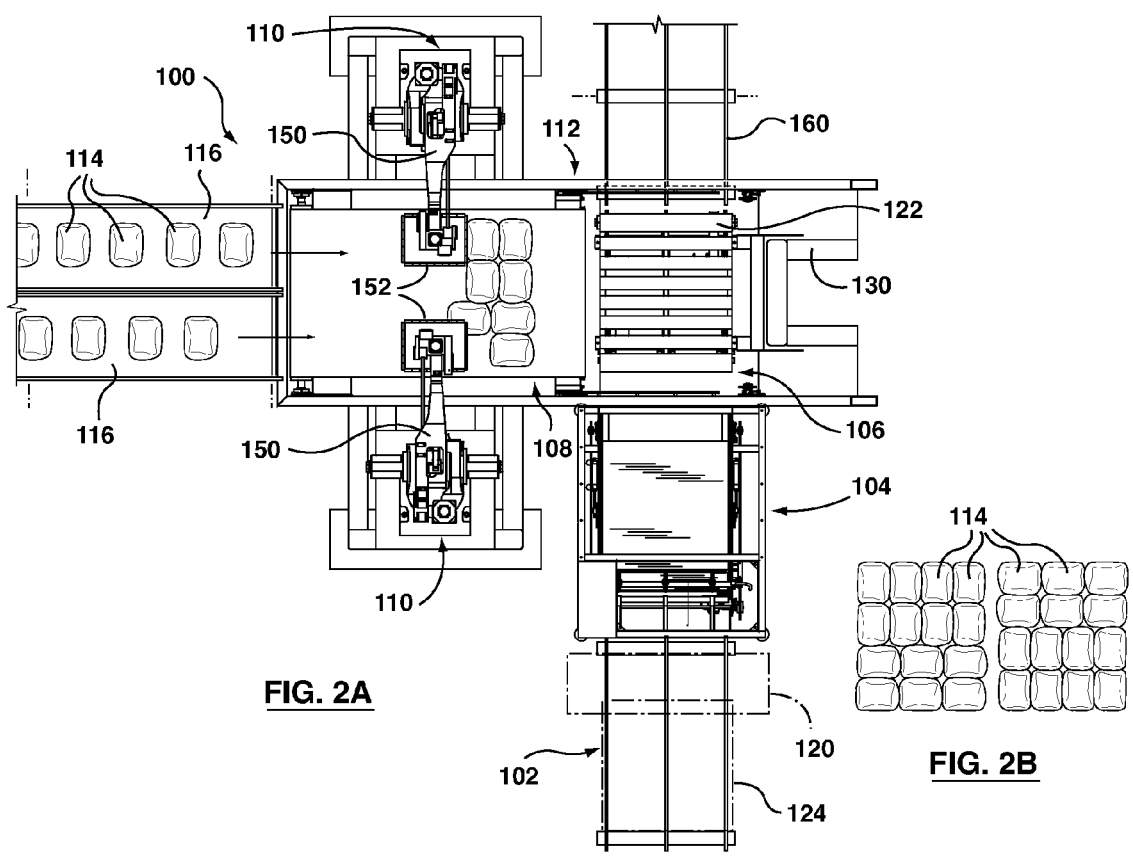
FIG. 2A is a plan view of the palletizing system of FIG. 1, receiving items to be palletized.
FIG. 2B shows respective positioning of items within alternating layers of a pallet.
Figure 2C:
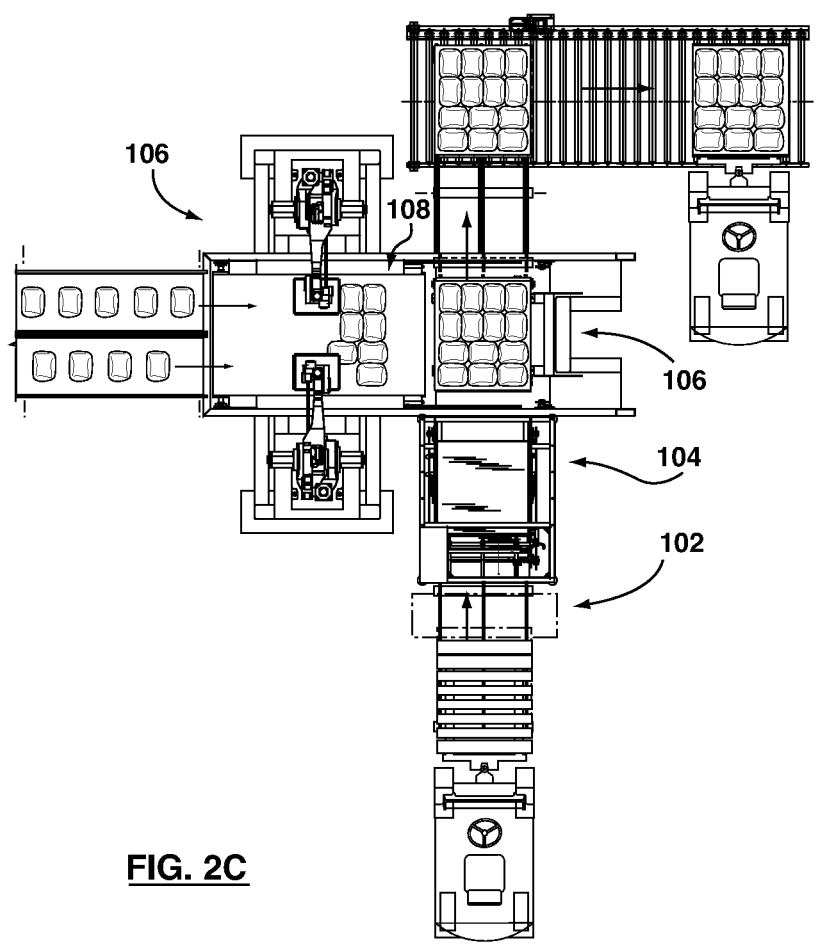
FIG. 2C is a plan view of the palletizing system of FIG. 1, forming part of a larger facility and palletizing items.
Figure 3:
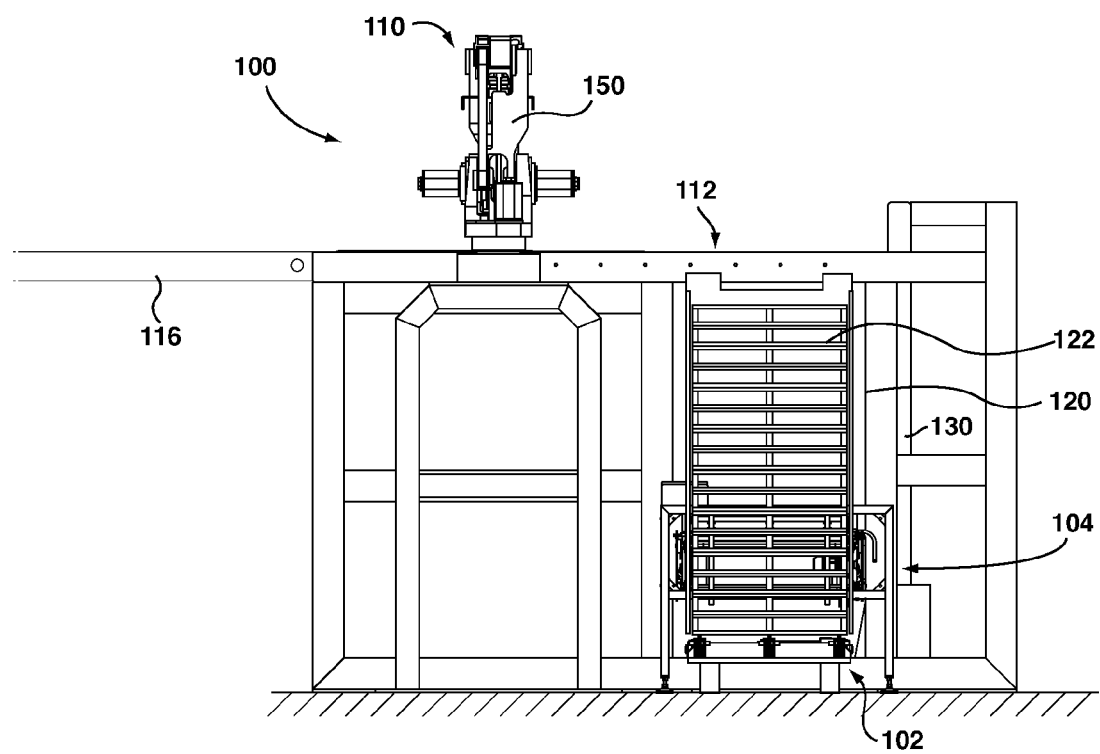
FIG. 3 is an end view of the palletizing system of FIG. 1.
Figure 6F:
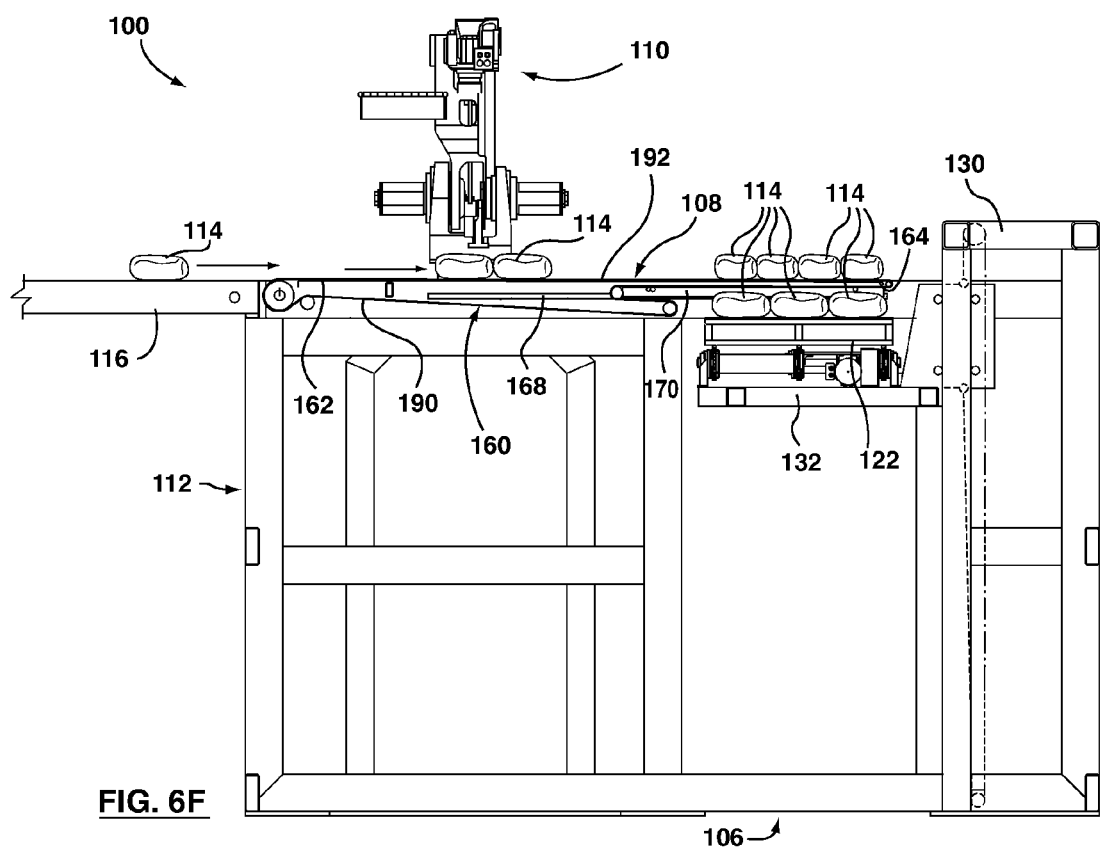
Figure 6G:
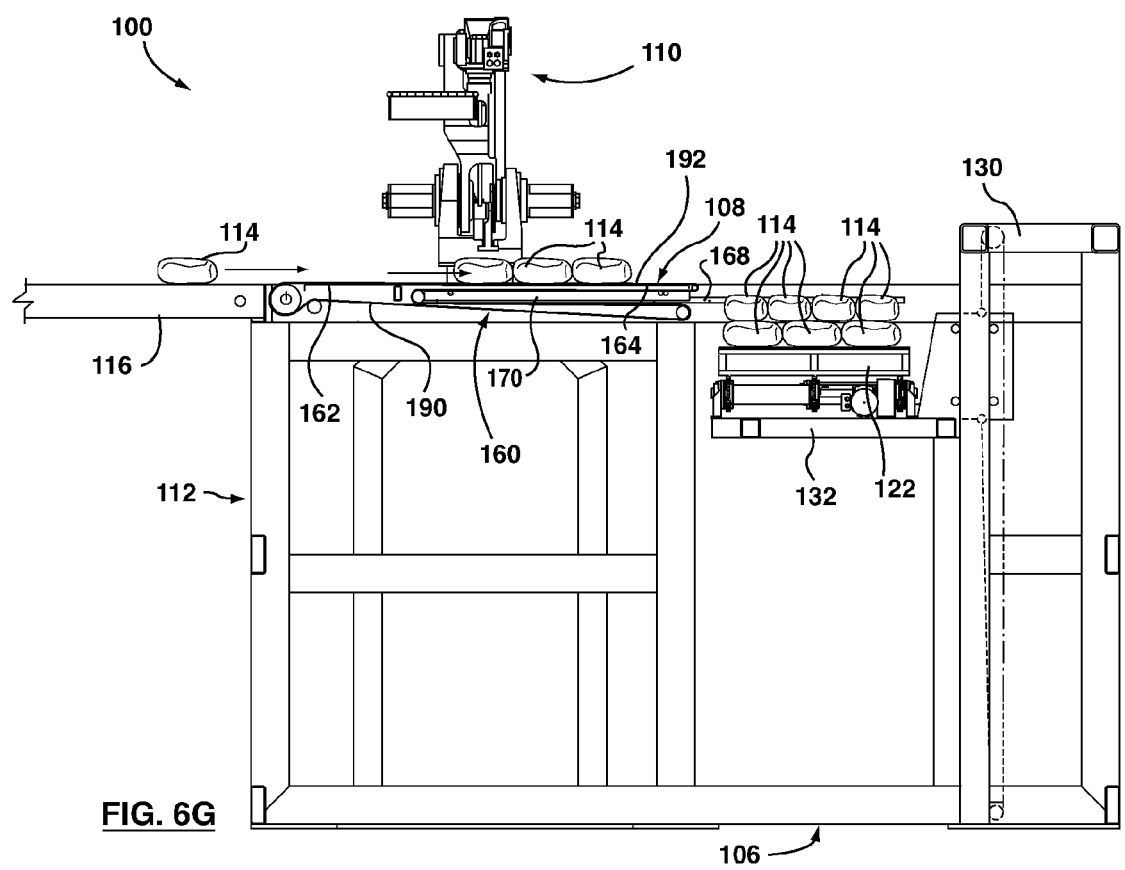

As shown in FIG. 6F, once the elevator platform 132 has been lowered, the upper transport surface 192 is once again extended to overlie the pallet 122, and the conveyor belt 190 can be restarted after the extension begins. Thus, once the upper transport surface 192 overlies the pallet 122, the conveyor belt 190 will have moved the next layer of items 114 into position over the previous layer of items 114 on the pallet 122. The conveyor belt 190 can then be stopped again and the upper transport surface 192 again retracted to deposit the next layer of items 114 atop the previous layer of items, as shown in FIG. 6G. This process can continue to repeat until the pallet 122 is loaded, at which point the elevator platform 132 moves to the pallet transfer position so that the loaded pallet can be discharged and an empty pallet loaded onto the elevator platform 132, at which point the method returns to the step shown in FIG. 6A. As can be seen in FIGS. 6F and 6G, the items 114 in the layer of items 114 are assembled in a predetermined pattern relative to one another on the upper transport surface, and the items 114 in the layer of items 114 remain in the predetermined pattern once deposited on the pallet 122. The predetermined pattern is selected to provide stability to the stack of items on the pallet 122 by avoiding individual columns of items stacked one atop the other with each item aligned with the item above and below it. Instead, as shown in FIGS. 1C and 2B, the layers of items 114 are arranged so that alternating layers cooperate to form an interlocking brick pattern where each item 114 overlies, and is overlain by, more than one item 114.

A more detailed explanation of the method illustrated in FIGS. 6A to 6G is now provided.

As shown in FIG. 6A, a first layer of items 114 is assembled on the movable conveyor belt 190 which, as described above, is movable along a support platform, namely the conveyor platform assembly 160. The conveyor belt 190 is then advanced, as shown in FIG. 6B, so that the first layer of items 114 is disposed above and in registration with the pallet 122, as shown in FIG. 6C. Optionally, mechanical clamps (not shown) may be used to stabilize the layer of items 114 once in position, or fixed stops (also not shown) may be used to the same effect. In the illustrated embodiment, advancing of the conveyor belt is carried out at the same time that the retractable portion of the support platform, namely the movable platform 164, is extended to a position above and in registration with the pallet 122. Thus, while the conveyor belt 190 is advancing, the portion of the conveyor belt 190 associated with the movable platform 164 (that is, the portion of the conveyor belt 190 that had been disposed immediately underneath the movable platform 164 when the movable platform 164 was in the retracted position) is also being extended. While the conveyor belt 190 is advancing and the movable platform 164 is extending, the manipulators 110 are simultaneously assembling a second layer of items 114 on the conveyor belt behind the first layer of items 114. The extension of the movable platform 164 and advancing of the conveyor belt 190 should be fast enough that the first layer of items 114 is positioned above and in registration with the pallet 122 well before the second layer of items 114 is completed, to provide time for the first layer of items 114 to be deposited onto the pallet 122.

Once the first layer of items 114 is positioned above and in registration with the pallet 122, the conveyor belt 192 is then stopped. As shown in FIG. 6D, the movable platform 164, along with an associated portion of the conveyor belt 190 (i.e. the part of the stopped conveyor belt 190 overlying the moveable platform 164) are retracted from their position above and in registration with the pallet 122 and beneath the first layer of items 114 so that the items 114 fall onto the pallet 122 below. This refraction continues until the movable platform 164 has retracted enough to allow the entire layer of items 114 to drop onto the pallet 122. As a result of this retraction, the first layer of items is deposited on the pallet 122, as can be seen in FIG. 6D. Preferably, the distance between the upper transport surface 192 defined by the conveyor belt 190, and the pallet 122 (or a previous layer of items 114) is as shallow as possible to limit disturbance in the position of the items 114 as they are deposited. As will be understood by reference to FIGS. 5A and 5B, as the movable platform 164 is retracting, the portion of the stopped conveyor belt 190 overlying the moveable platform 164, which would otherwise be excess, is folded underneath the moveable platform 164. This keeps the upper transport surface 192 defined by the conveyor belt 190 stationary in relation to the lower surface of the items 114. Thus, as the movable platform retracts, the stopped conveyor belt 190 is gently peeled away from underneath the items 114, thereby reducing friction effects that could disturb the position of the items 114 during retraction. Preferably, while the movable platform 164 and associated portion of the conveyor belt 190 are being retracted, the manipulators 110 are continuing to assemble the second layer of items 114.

Then, as shown in FIG. 6E, the pallet 122 is indexed downward by lowering the elevator platform 132 by a predetermined distance sufficient to provide clearance between the layer of items 114 that was just deposited on the pallet 122 and the movable platform 164 along with the portion of the conveyor belt 190 passing thereunder. Generally speaking, this distance will be approximately equal to, or slightly greater than, the a height of the first layer of items 114. Preferably, the manipulators 110 are continuing to assemble the second layer of items 114 while the pallet 122 is indexed downwardly.

Next, as shown in FIG. 6F, the movable platform 164 is extended back to the position above and in registration with the pallet 122, which has the effect of correspondingly extending the associated portion of the conveyor belt 190 (that is, the portion of the conveyor belt 190 that had been disposed immediately underneath the movable platform 164 when the movable platform 164 was in the retracted position underneath the stationary platform 162). As the movable platform 164 is extended, the conveyor belt 190 is advanced to position the second layer of items 114 above and in registration with the pallet 122. Optionally, the manipulators 110 may be completing the second layer of items 114 during this extension process.

The conveyor belt 190 is then stopped, and the movable platform 164 and the associated portion of the conveyor belt 190 are then retracted, thereby depositing the second layer of items 114 atop the first layer of items 114, as shown in FIG. 6G. With reference again to FIG. 6F, preferably the conveyor belt 190 begins to advance immediately after the movable platform 164 begins to extend, and advances at a speed equal to, or even slightly greater than, the speed at which the movable platform 164 is extending, creating room for the manipulators 110 to begin building a further layer of items 114 as soon as the second layer is completed. This methodology enables nearly continuous stacking of full layers of items 114 onto the pallet 122, with the exception of pallet transfer time (i.e. unloading of a full pallet and loading of an empty pallet). Pallet transfer time may be absorbed by having the manipulators 110 accumulate two full layers of items 114, with one layer disposed on the fully extended movable platform 164 and the other layer on the stationary platform 162 during the pallet transfer process. Where this approach is used, the timing of system operations must be such that both accumulated layers are be used before loading of the next pallet is completed, as this space is required for layer accumulation during the next pallet transfer operation. In addition, a small amount of additional buffer may be obtained by allowing items 114 to accumulate in the accumulation conveyors 116, which may be used in the event that the pallet transfer takes longer than anticipated.

In addition to the use of servo motors that can report the position of the components they control, various sensors may be positioned on the palletizing system 100 to monitor the position of components or of items 114 or pallets 122. For example, sensors may be used to detect and verify the positioning of a pallet 122 underneath the sheet placement machine 104, and on the elevator platform 132. Sensors may also be used with the elevator 106 to monitor the position of the top of the uppermost layer of items 114, since layer heights may vary due to changing product density, bag tightness etc. A controller, such as a programmable logic controller or a suitably programmed general purpose computer, can use the input from the servo motors and sensors to control operation of the palletizing system 100 and avoid malfunctions. For example, and without limitation, a sheet should not be deposited unless a pallet 122 is positioned under the sheet placement machine, the elevator platform 132 should not be raised until it is confirmed that a pallet 122 is disposed thereon, and the movable platform 164 should not be retracted unless the elevator platform 132 is at the correct height, or extended if the elevator platform 132 has not yet indexed downward sufficiently to provide clearance.

Construction and operation of an exemplary sheet placement machine 104 will now be described. With reference now to FIGS. 8 to 15B, the sheet placement machine 104 comprises a support structure 812, which includes a sheet stack magazine 814, which is sized and shaped to receive a stack of cover sheets, and a frame 816 for elevating the magazine 814 to define a pallet receiving region 818 beneath the magazine 814. Preferably, the frame 816 and the magazine 814 are arranged so that the pallet receiving region 818 is positioned directly beneath the magazine 814.

The support structure 812 carries a sheet lifting mechanism and a sheet placement mechanism. The sheet lifting mechanism includes a sheet lifting member 832 that is movable relative to the support structure 812, and a sheet lifting member actuator for moving the sheet lifting member. As will be explained in greater detail below, when a stack of sheets is contained in the magazine 814, the sheet lifting member 832 can capture the top sheet from the stack of sheets, lift the sheet above the stack of sheets and release the sheet to the sheet placement mechanism. The sheet placement mechanism includes a movable sheet placement member 836, and a sheet placement member actuator for moving the sheet placement member 836. As will be detailed below, the sheet placement member can receive and capture the sheet from the sheet lifting member 832, carry the sheet in an arcuate path around the edge of the magazine 814 to a position beneath the magazine 814 and above the pallet receiving region 818, and, when a pallet 122 is received in the pallet receiving region 818, release the sheet onto the pallet in alignment therewith. Thus, when a stack of sheets is contained in the magazine and a pallet 122 is received in the pallet receiving region 818, the sheet lifting mechanism and the sheet placement mechanism cooperate to transfer the top sheet from the stack of sheets to the pallet 122. Details of the exemplary embodiment will now be described.

The magazine 814 is defined by a rectangular baseplate 820, preferably made from a mesh or grate material, in cooperation with L-shaped corner guides 822 positioned at each corner thereof to maintain a stack of cover sheets in proper alignment. The frame 816 includes four legs 824 secured to one another by cross-members 826.

The support structure 812 includes two opposed guide plates 830 that are arranged on opposite sides of the magazine 814 and mounted to the frame 816. The guide plates 830 carry the sheet lifting member 832, the sheet lifting member actuator 834, a sheet placement member 836, and a sheet placement member actuator.

Figure 17:
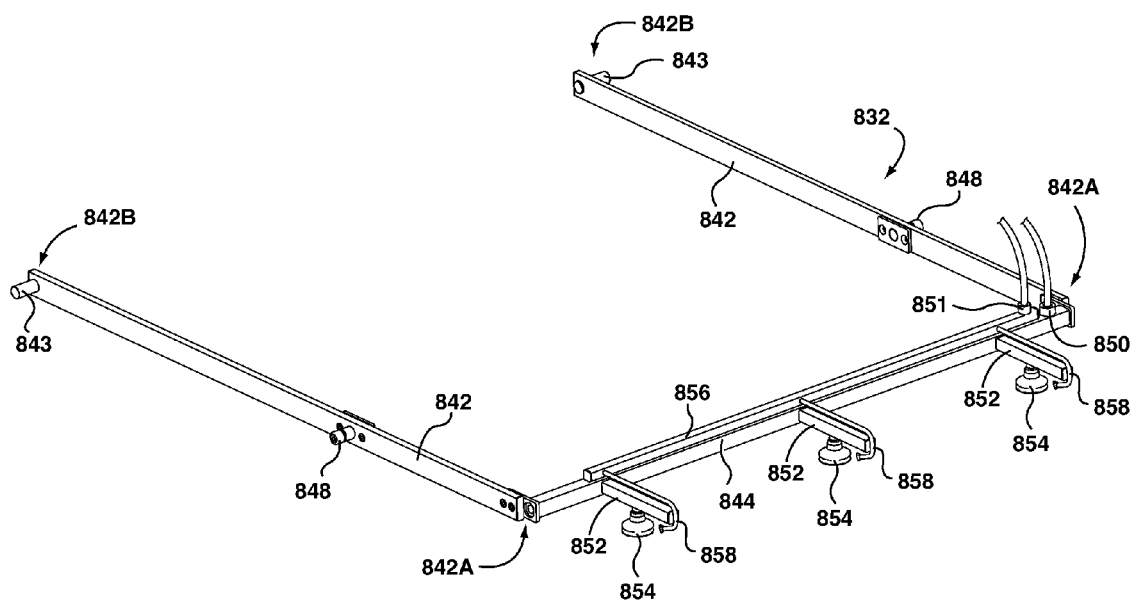
FIG. 17 is a perspective view of a sheet lifting member forming part of the sheet placement machine of FIG. 8.

With reference now to FIG. 17, the sheet lifting member 832 is generally U-shaped, and comprises two pivot arms 842 connected to one another at their first ends 842A by a hollow cross-member 844 which forms part of a sheet lifting member capturer for releasably securing a sheet to the sheet lifting member 832, as will be explained below. The second ends 842B, that is, the ends 842B of the pivot arms 842 that are distal from the hollow cross-member 844, are pivotingly mounted by way of pivot shafts 843 to the respective guide plates 830 on the inner faces thereof, that is, on the face of each guide plate 830 facing toward the magazine 814. A respective lifting roller 848 (comprising a bearing on a post) is disposed on each pivot arm 842, between the first and second ends 842A, 842B. The hollow cross-member 844 communicates by way of a coupling 850 with a selectively operable vacuum pump, and also with a plurality of hollow fingers 852 terminating in suction cups 854, enabling the suction cups 854 to draw a vacuum and thereby grip a slip sheet. A compressed air supply tube 856 runs along the length of the cross-member 844, and communicates at one end with a selectively releasable supply of compressed air by way of a coupling 851, and also with a plurality of hook-shaped sheet separator nozzles 858 arranged along the length of the compressed air supply tube 856. The sheet separator nozzles 858 extend along and curve around the ends of the fingers 852 to selectively supply compressed air adjacent the suction cups 854.

Referring again to FIGS. 8 to 15B, each of the guide plates 830 also includes an arcuate guide slot 846, in which the respective lifting roller 848 on the respective pivot arm 842 is slideably received. Thus, the sheet lifting member 832 is movably mounted to the support structure 812, and in particular to the guide plates 830, so as to be movable between a sheet release position, defined by the upper limit of the arcuate guide slots 846, and a bottom sheet capture position, defined by the lower limit of the arcuate guide slots 846, with the hollow cross-member 844 positioned adjacent the baseplate 820 of the magazine 814. Between the sheet release position and the bottom sheet capture position, the sheet lifting member is movable through a range of intermediate sheet capture positions, defined by the extent of the arcuate guide slots 846, so that it can capture the top sheet in a stack of sheets regardless of the height of the stack (as long as the height of the stack is below the sheet release position).

Figure 12:
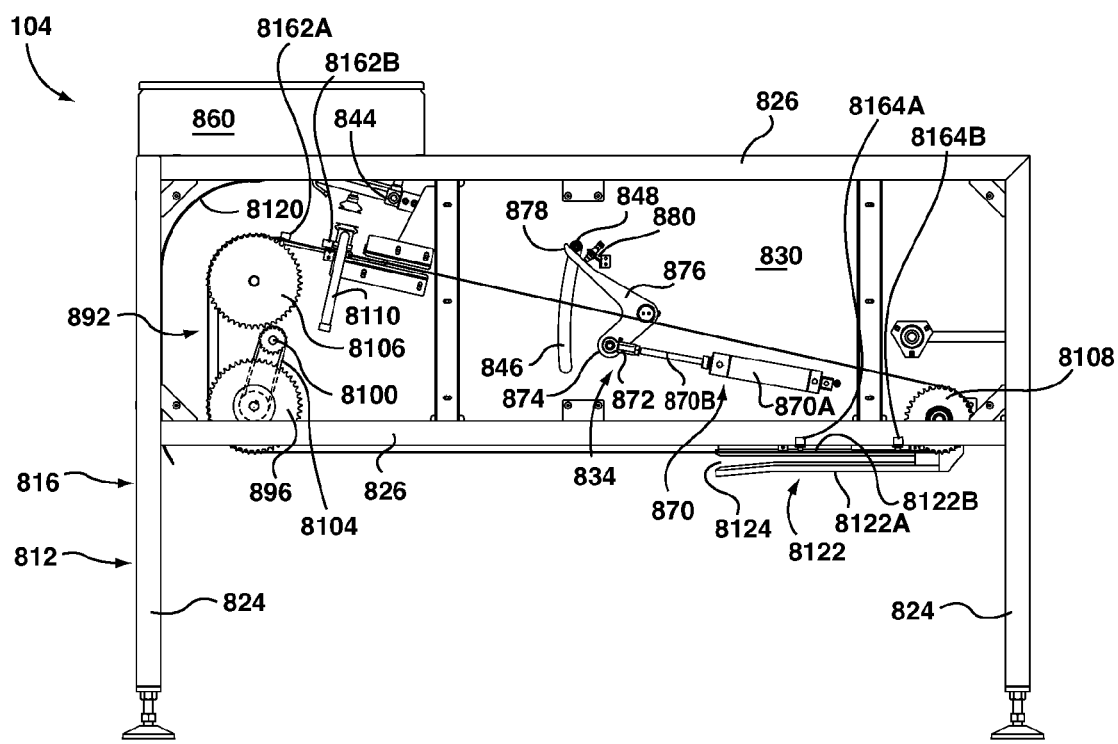
FIG. 12 is a first side view of the sheet placement machine of FIG. 8.
Figure 13:
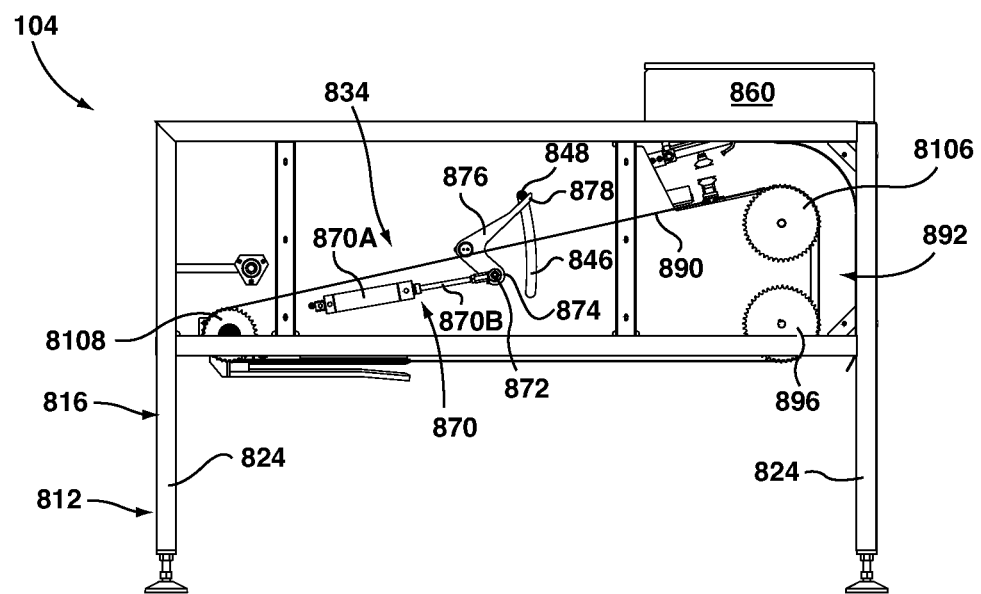
FIG. 13 is a second side view of the sheet placement machine of FIG. 8.
Figure 14:
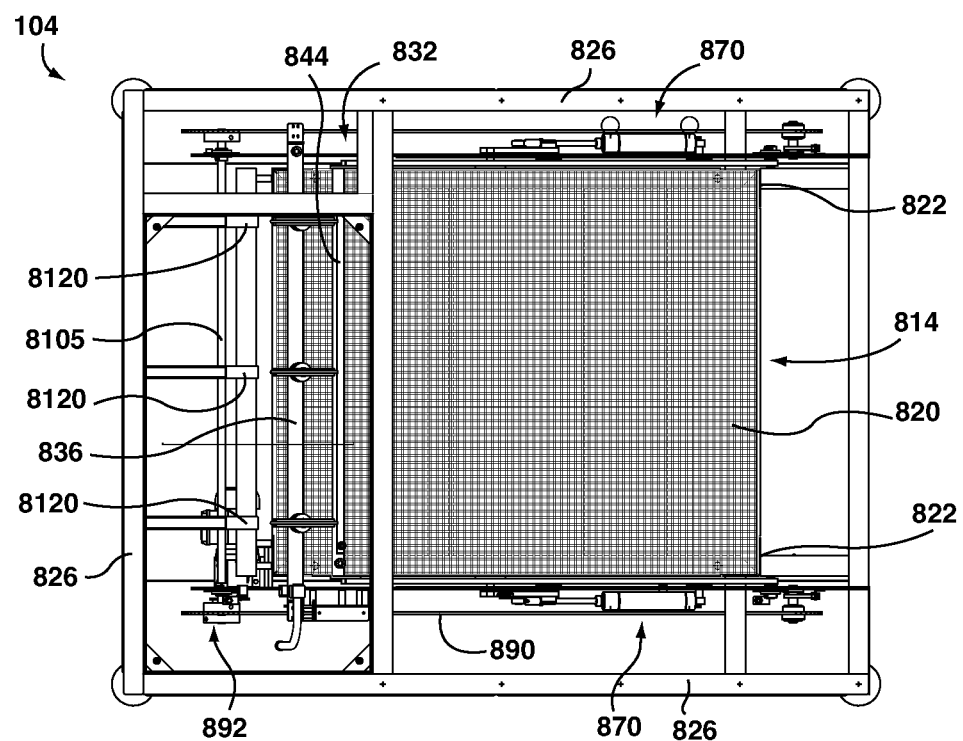
FIG. 14 is a top view of the sheet placement machine of FIG. 8.

The sheet lifting member actuator 834 is also mounted to the support structure 812, and comprises a plurality of parts. As best seen in FIGS. 12 and 13, in the illustrated embodiment, a piston 870 comprising a cylinder 870A and piston arm 870B is mounted to each of the guide plates 830 on the outer face thereof, that is, on the face of each guide plate 830 facing away from the magazine 814. More particularly, the end of the cylinder 870A that is distal from the piston arm 870B is pivotally mounted to the respective guide plate 830. The distal end 872 of each piston arm 870B is pivotingly secured to one end 874 of a generally L-shaped pivot member 876, which is pivotingly secured at its vertex to the outer face of the respective guide plate 830 and whose other end 878 supports the lifting roller 848 on the respective pivot arm 842 (not visible in FIGS. 12 and 13). Extension of the pistons 870 rotates the pivot members 876 and lifts the lifting rollers 848 on the pivot arms 842 to the upper limit of the arcuate guide slots 846, thereby moving the sheet lifting member 832 to the sheet release position. Conversely, contraction of the piston 870 rotates the pivot member in the opposite direction, allowing the lifting rollers 848 on the pivot arms 832 to slide under the influence of gravity to the lower limit of the arcuate guide slots 846, so that the sheet lifting member 832 falls under the influence of gravity to the bottom sheet capture position. A sensor 880 is mounted on the outer face of one of the guide plates 830 to detect when the pivot members 876 have pushed the lifting rollers 848 to the upper limit of the guide slots 846 and provide this information to a controller.

The sheet placement member 836 comprises a hollow member which extends parallel to the cross-member 844 and is movably mounted to the support structure 812. More particularly, each end of the sheet placement member 836 is secured to a chain 890 carried by a gear wheel arrangement 892 mounted on the outer face of the guide plate 830. Details of the gear wheel arrangement 892 are now provided.

Figure 15:
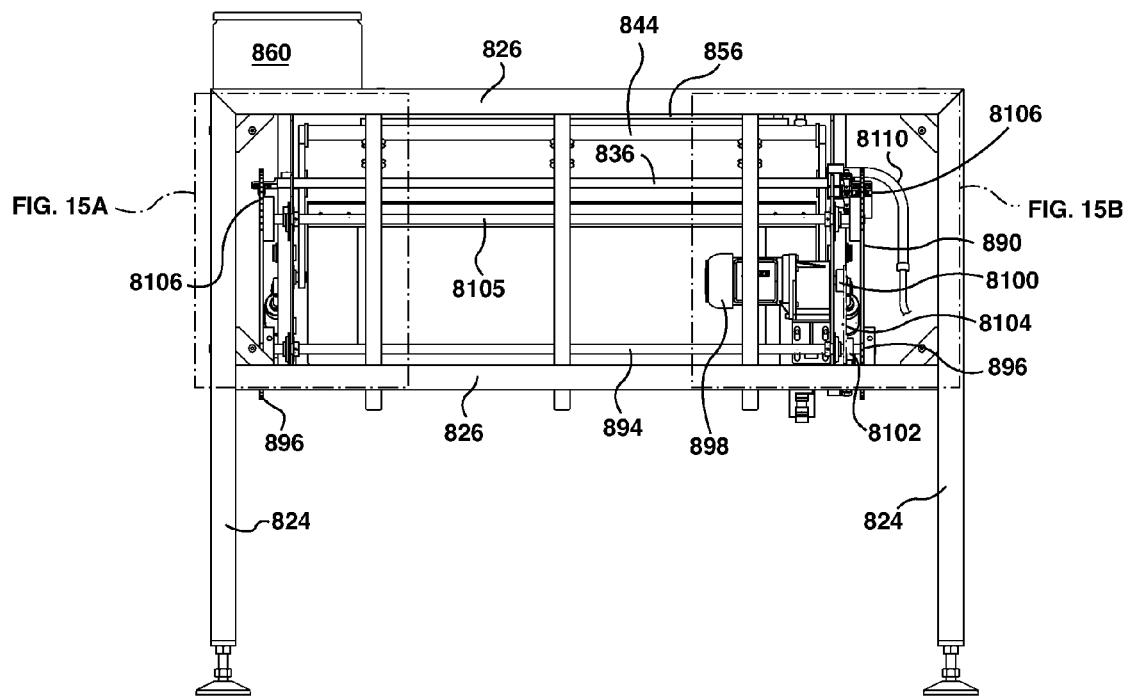
FIG. 15 is an end view of the sheet placement machine of FIG. 8.
Figure 15A:
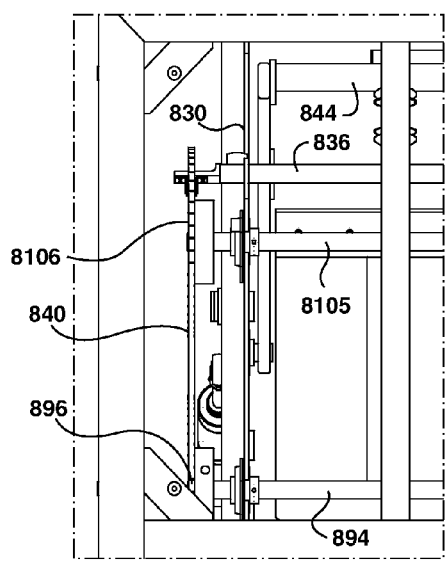
FIG. 15A is a more detailed view of a first portion of the view shown in FIG. 15.
Figure 15B:
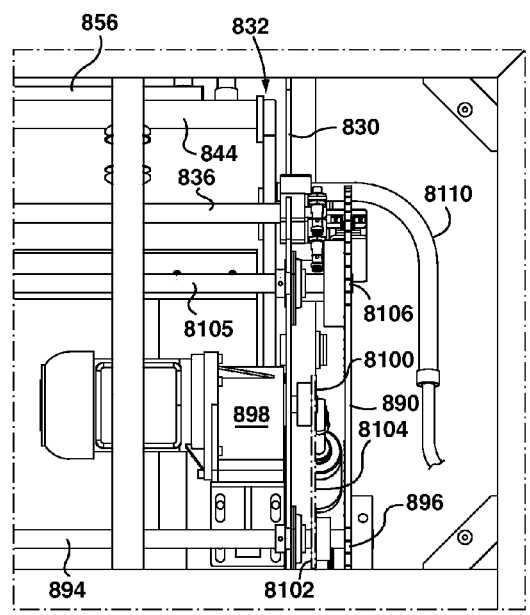
FIG. 15B is a more detailed view of a second portion of the view shown in FIG. 15.
Figure 16A:
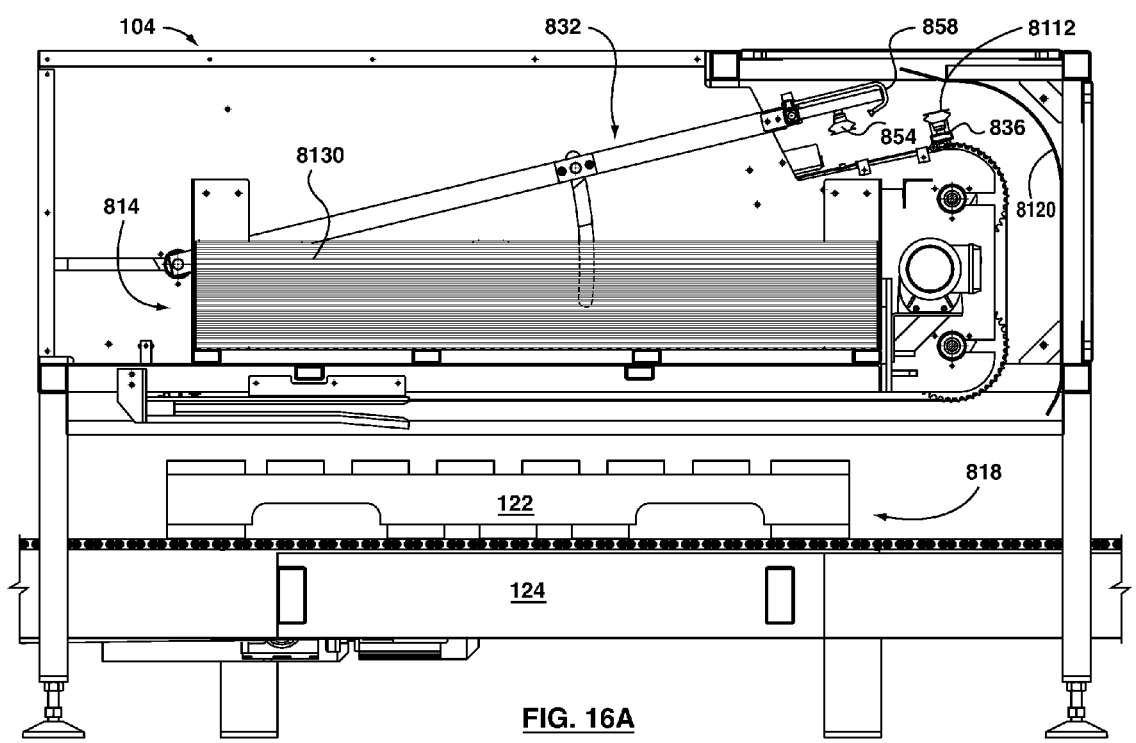
FIGS. 16A to 16H are side cross-sectional views illustrating a method of placing a sheet on top of a pallet, in accordance with an aspect of the present invention.
Figure 16B:
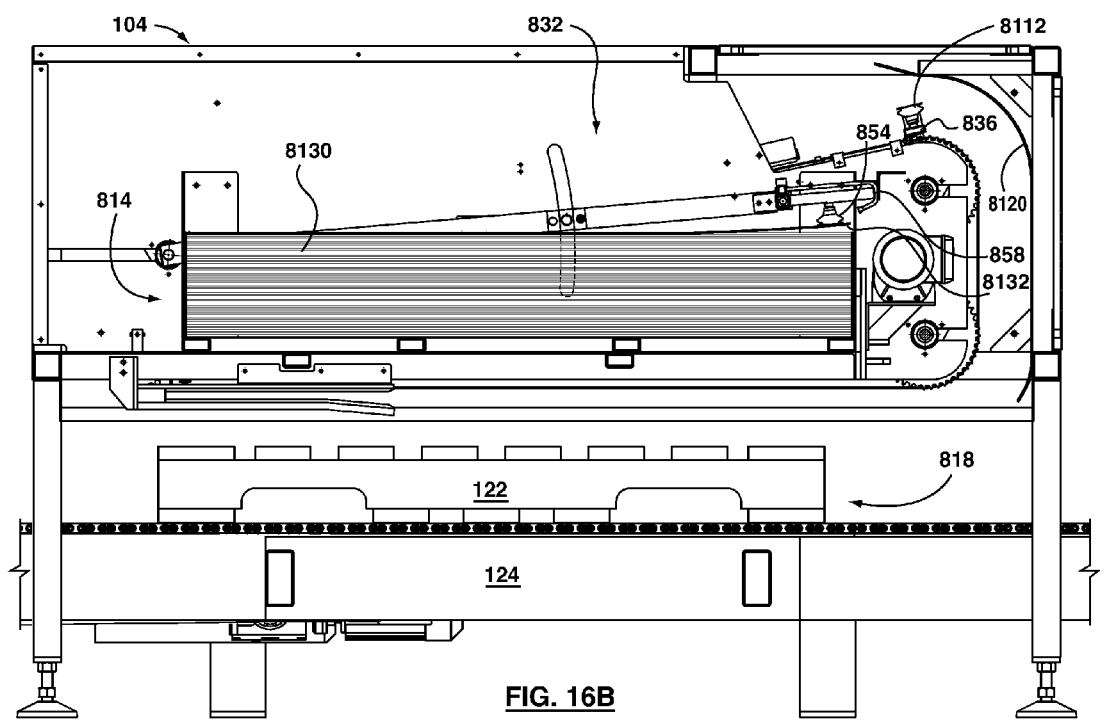

As best seen in FIGS. 15A and 15B, a drive shaft 894 extends between, and is rotatably mounted at its ends in, the guide plates 830, with a drive wheel 896 mounted at each end of the drive shaft 894, on the outside of a respective guide plate 830. The drive shaft 894, and hence the drive wheels 896, are driven by a motor 898, which is drivingly coupled to the drive shaft 894 by way of a motor gear wheel 8100 which is coupled to a gear ring 8102 on the drive shaft 894 by way of a drive chain 8104. It is the drive shaft 894 and the drive wheels 896 which cause movement of the chains 890. A driven shaft 8105 is positioned above the drive shaft 894, also extending between and rotatably mounted at its ends in the guide plates 830, with a driven wheel 8106 mounted at each end of the driven shaft 8105, outside of the respective guide plate 830. Spacer gear wheels 8108 (FIGS. 12 and 13) are mounted on the outside of the guide plates 830, at the end of the respective guide plate 830 opposite the end at which the drive wheels 896 and driven wheels 8106 are mounted, so that when the chains 890 are mounted on the gear wheel arrangements 892, the chains 890 have a generally triangular configuration. The sheet placement member 836, being secured to the chains 890, is movable between a sheet receiving position opposed to and beneath the sheet lifting member when the sheet lifting member is in the sheet release position (as shown in FIG. 16B), and a sheet placement position between the magazine 814 and the pallet receiving region 818 in which a sheet carried by the sheet placement member 836 is aligned with the pallet receiving region 818 (see FIGS. 16E and 16F). Thus, the motor 898, together with the above-described gear wheel arrangement 892, including the spacer wheels 8108, together comprise a sheet placement member actuator coupled to the sheet placement member 836 for reciprocating the sheet placement member 836 between the sheet receiving position and the sheet release position.

A plurality of curved sheet guides 8120 are carried by the support structure 812, adjacent the end of the support structure 812 at which the drive wheels 896 and driven wheels 8106 are mounted. As shown in FIG. 12, at the opposite end of the support structure 812 from the curved sheet guides 8120, on the side carrying the motor 898, a stabilizing guide 8122 is disposed on the underside of the support structure 812. The stabilizing guide 8122 comprises an upper portion 8122A and a lower portion 8122B with a gap 8124 defined therebetween, and the sheet placement member 836 is received in the gap 8124 when it is in the sheet release position.

Figure 10:
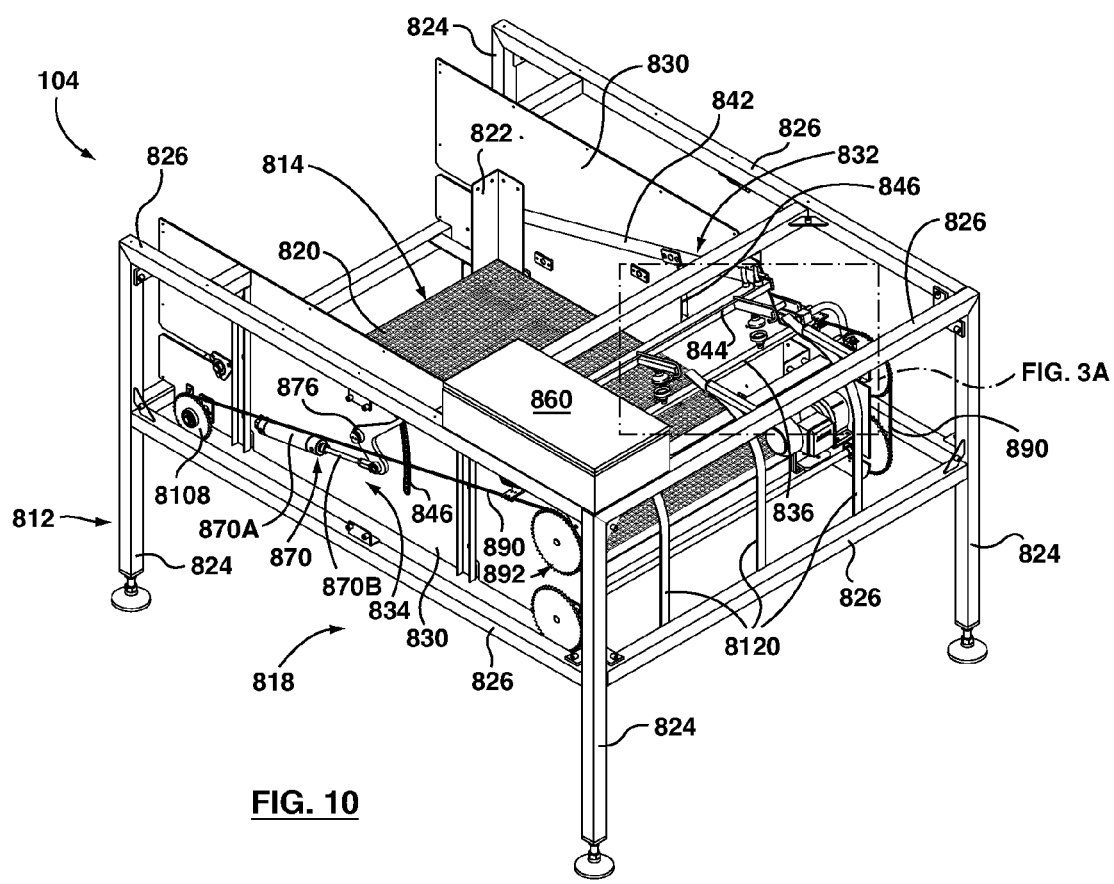
FIG. 10 is a third perspective view of the sheet placement machine of FIG. 8.
Figure 10A:
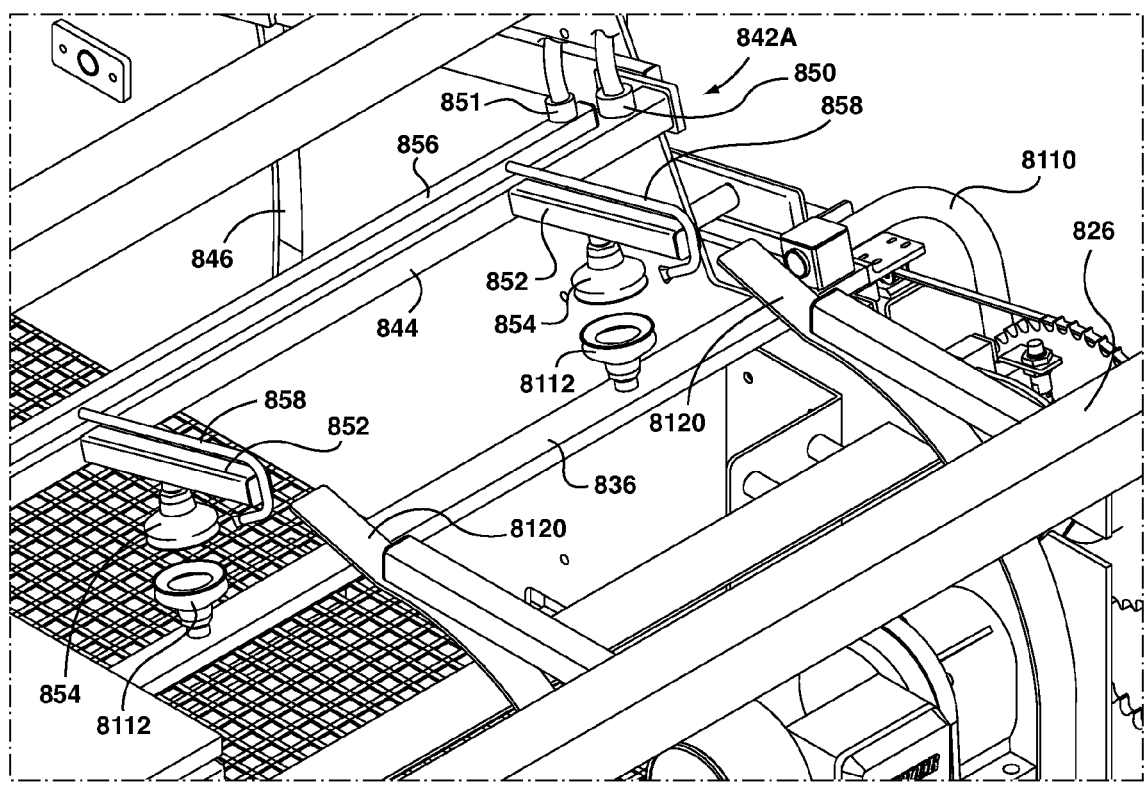
FIG. 10A is a more detailed view of a portion of the view shown in FIG. 10.
Figure 11:
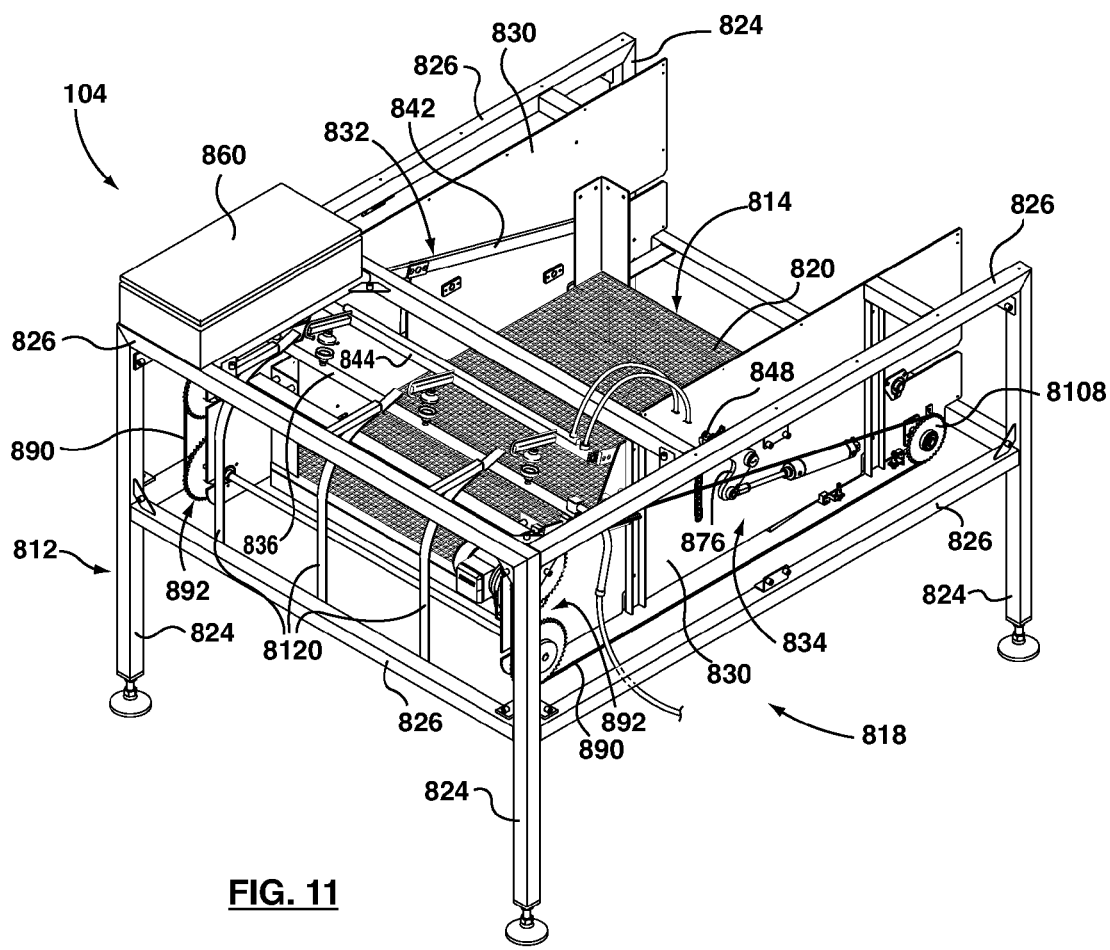
FIG. 11 is a fourth perspective view of the sheet placement machine of FIG. 8.
Figure 18:
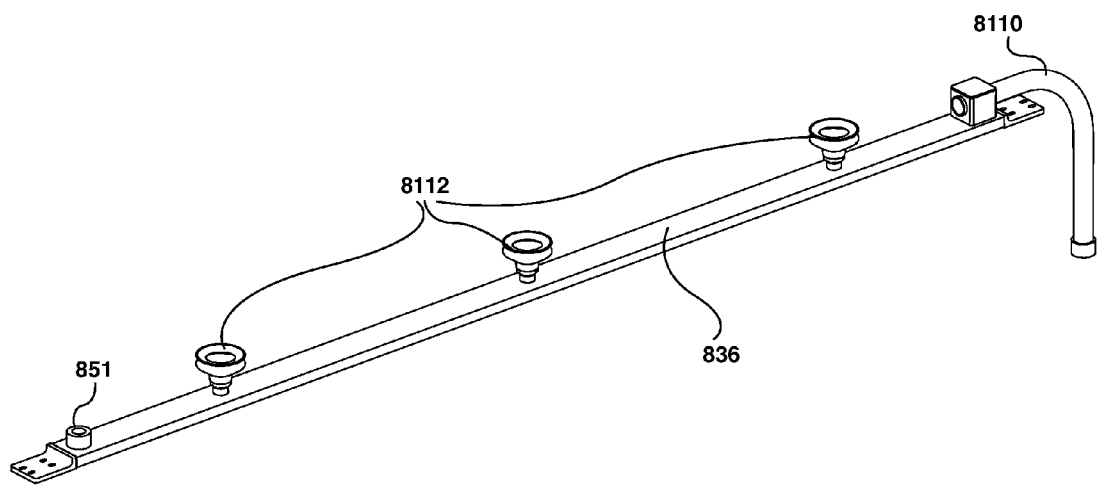
FIG. 18 is a perspective view of a sheet placement member forming part of the sheet placement machine of FIG. 8.

The sheet placement member 836 has a sheet placement member capturer for releasably securing a sheet to the sheet placement member 836. As best seen in FIG. 10A, in the illustrated embodiment, the sheet placement member 836 is hollow, and is in communication by way of tube 8110 with a selectively operable vacuum pump. The sheet placement member 836 communicates with suction cups 8112, enabling the suction cups 8112 to draw a vacuum, and thereby grip a slip sheet. The sheet placement member 836 is shown in isolation in FIG. 18.

As will be described in greater detail below, the sheet lifting member 832, the sheet lifting member actuator 34, the sheet placement member 836 and the sheet placement member actuator are cooperable to, when a stack of sheets is contained in the magazine 814 and a pallet 122 is received in the pallet receiving region 818, transfer the top sheet from the stack of sheets to the pallet.

With reference now to FIGS. 16A through 16H, a method of transferring a top sheet from a stack of sheets to a pallet will be described. For ease of illustration, in FIGS. 16A through 16F only those elements specifically referred to in the following discussion are numbered.

In the illustrated embodiment of the method, a sheet placement machine 104 is provided with a stack 8130 of slip sheets disposed in the magazine 814, with a pallet 122 positioned below the sheet placement machine 104. The pallet 122 is carried on the pallet feeding conveyor 124, which stops with the pallet 122 positioned in the pallet receiving region 818. FIG. 16A shows a start position.

Figure 16C:
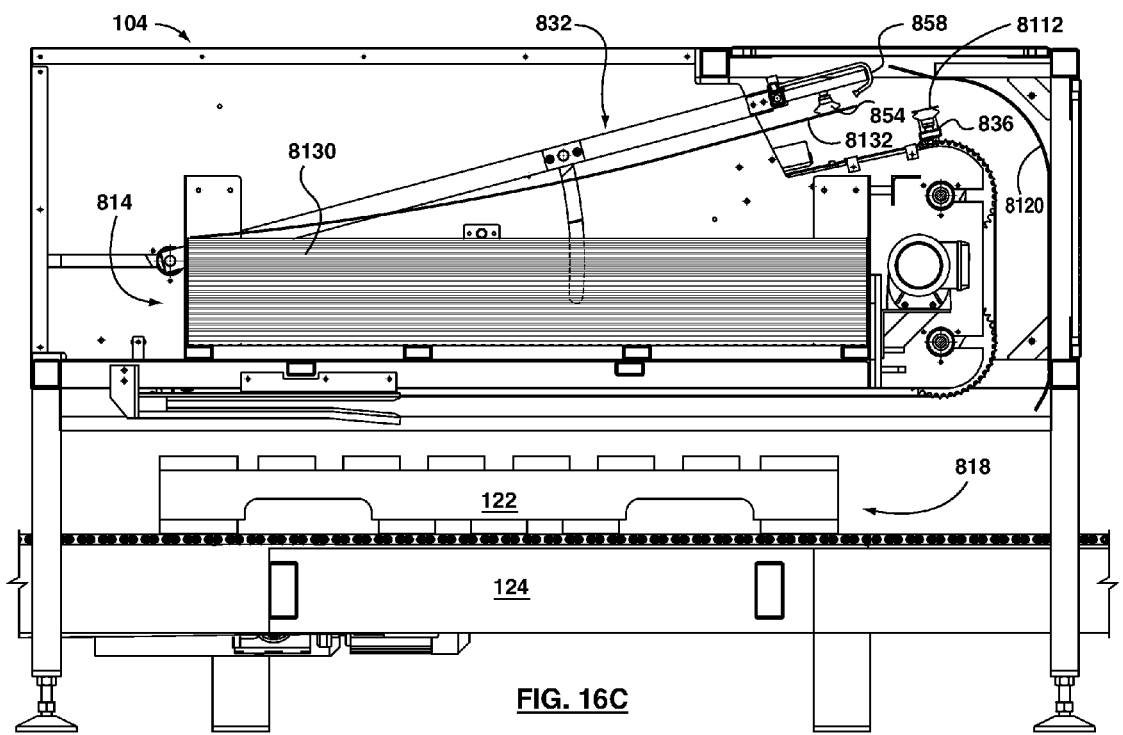

From the start position, the sheet lifting member 832 moves from the sheet release position spaced from the top of the stack 8130 of slip sheets (FIG. 16A) to a position at the top of the stack 8130 of slip sheets, as shown in FIG. 16B to capture the top sheet 8132 from the stack 8130 of slip sheets. In particular, the sheet lifting member 832 pivots toward the stack 8130 of slip sheets and releasably secures the top sheet 8132 to the sheet lifting member 832 by applying a vacuum to the suction cups 854, enabling them to grip the surface, and then lifts the sheet 8132 off the stack 8130 by pivoting back to the sheet release position as shown in FIG. 16C. Thus, the sheet 8132 is releasably secured to the sheet lifting member 832 by suction. As the suction cups 854 engage the sheet 8132, the sheet separator nozzles 858 apply a burst of compressed air to separate the sheet 8132 from any sheets that may have adhered to its underside, so that only the single sheet 8132 is releasably secured to the sheet lifting member 832.

Figure 16D:
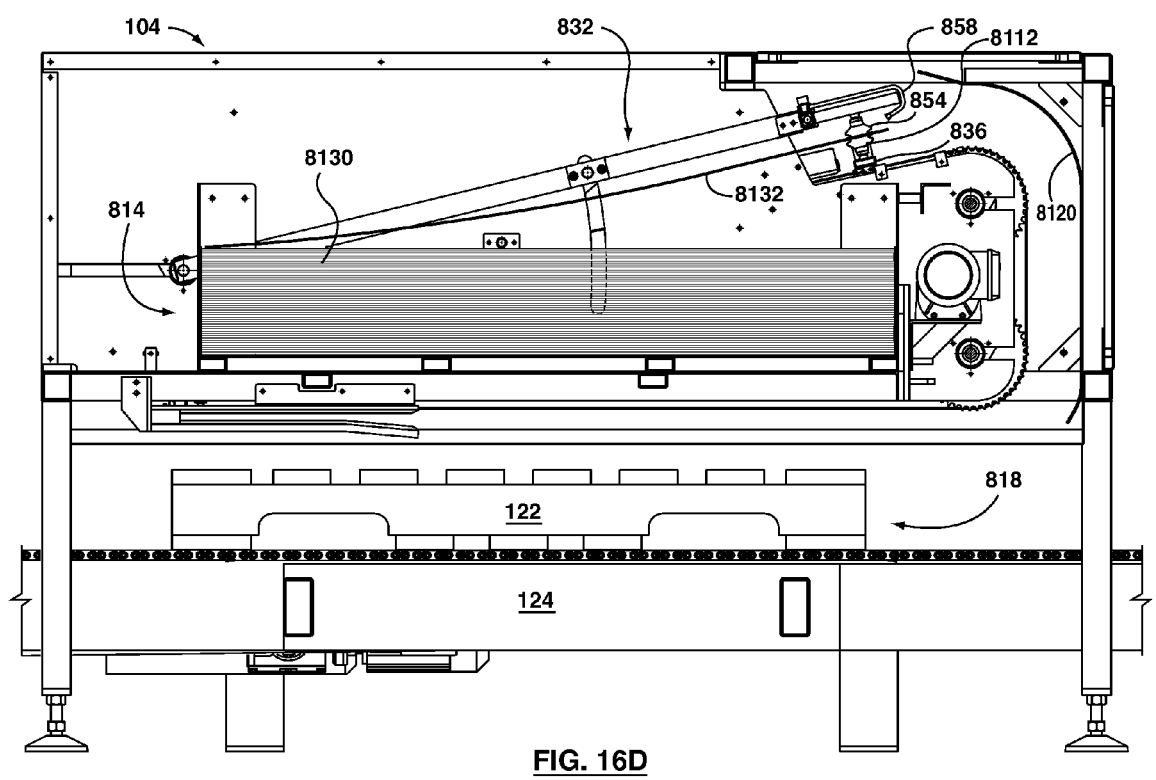

As shown in FIG. 16D, the sheet placement member 836 moves into the sheet receiving position, where the sheet placement member 836 is opposed to and beneath the sheet lifting member 832 and the sheet 8132 with the sheet lifting member 832 in the sheet release position. Still referring to FIG. 16D, the sheet 8132 is transferred from the sheet lifting member 832 to the sheet placement member 836 by activating suction on the sheet placement member 836, that is, applying a vacuum to the suction cups 8112 thereon, and releasing suction on the sheet lifting member 832, that is, releasing the vacuum from the suction cups 854 thereon. After the transfer, the sheet 8132 is releasably secured to the sheet placement member 836 by suction.

Figure 16E:
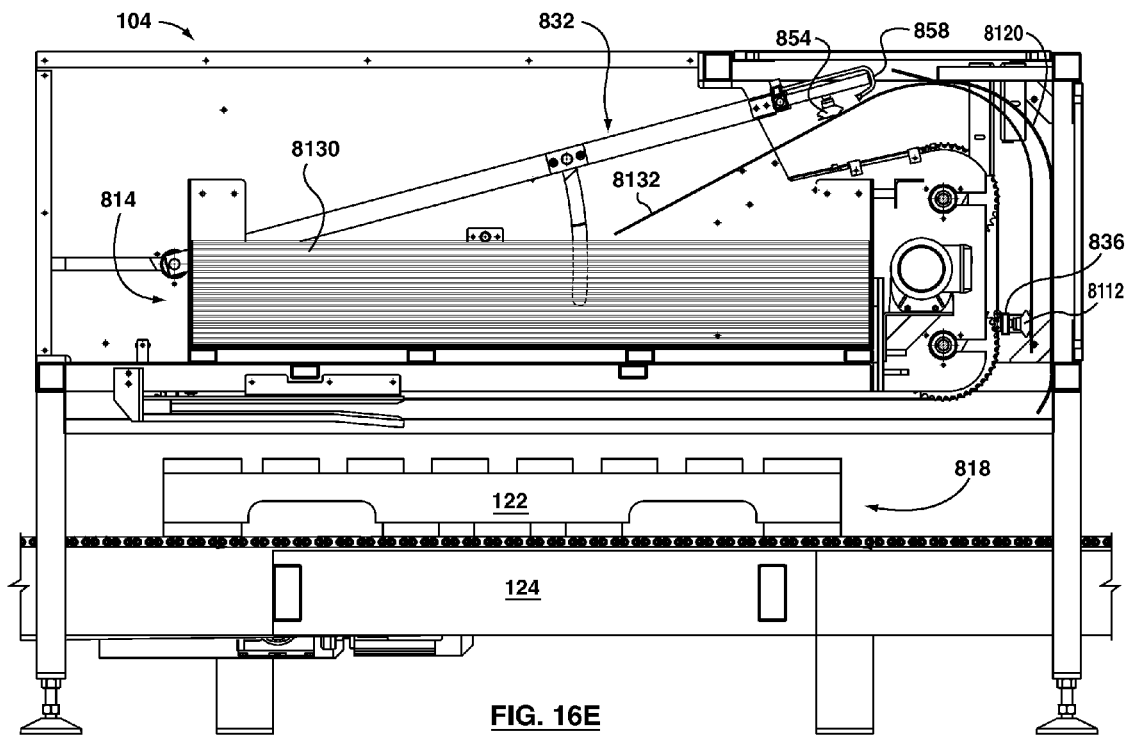
Figure 16F:
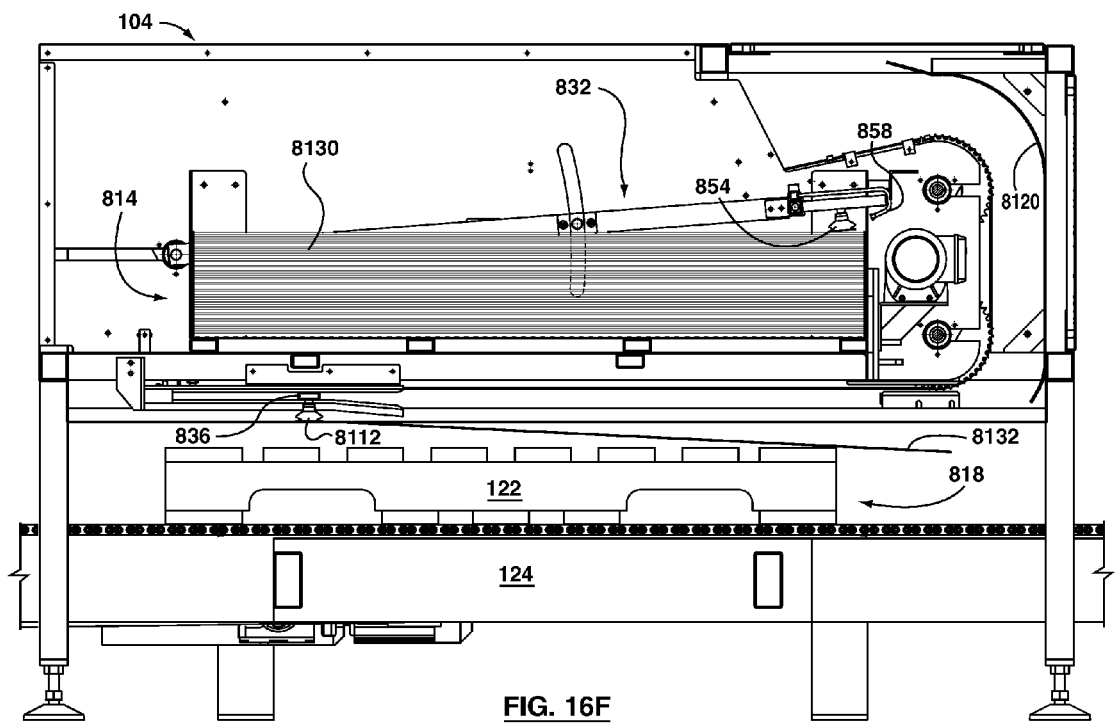
Figure 16G:
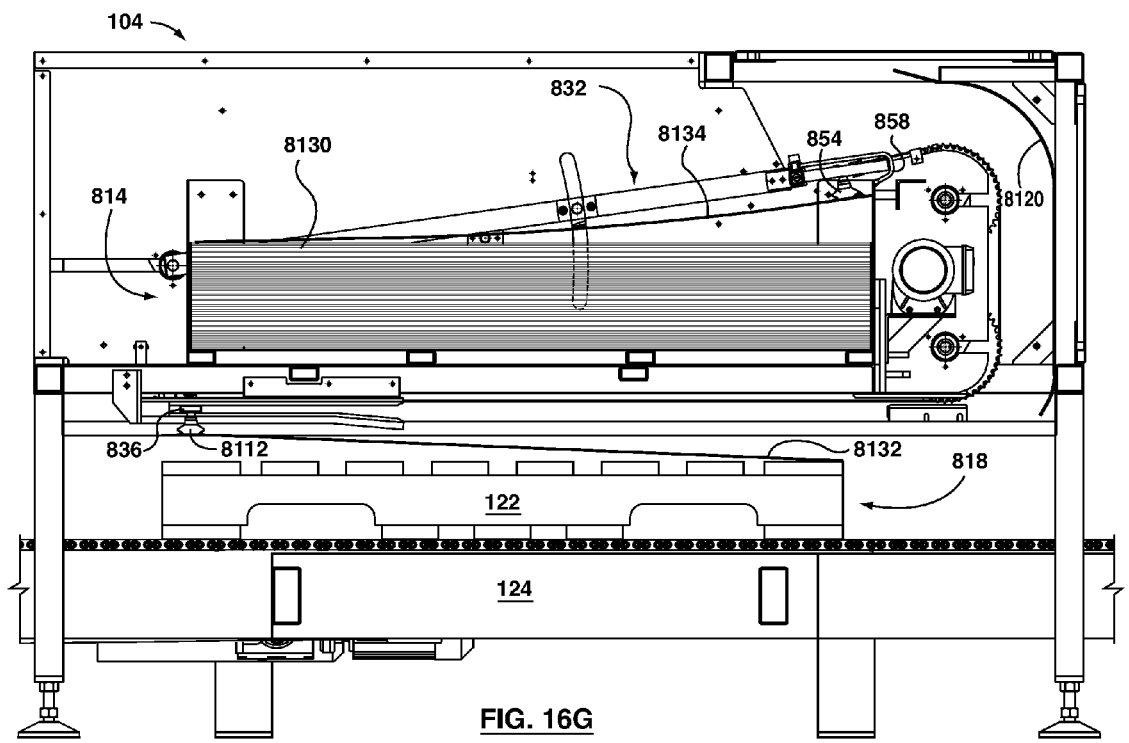
Figure 16H:
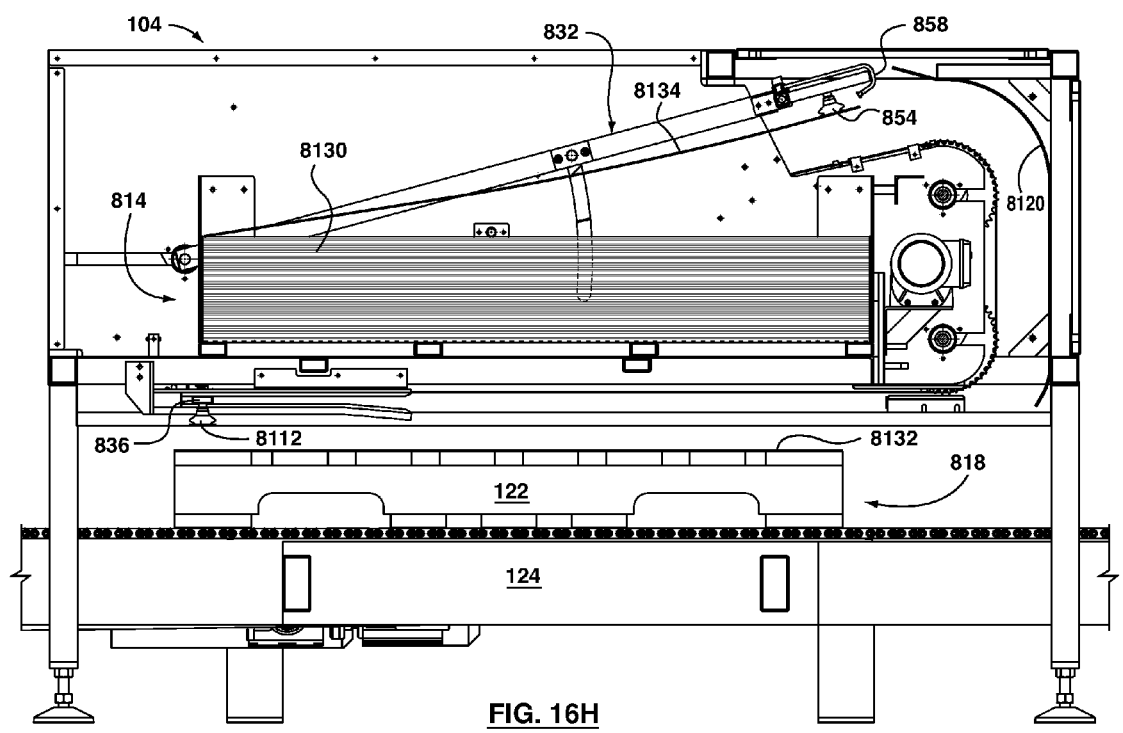

As shown in FIGS. 16E to 16G, the sheet placement member 836 carries the sheet 8132 in an arcuate path around the edge of the magazine 814 to the sheet placement position beneath the magazine 814 and above the pallet 122 (FIG. 16G), with the curved sheet guides 8120 assisting in guiding the sheet 8132 along the arcuate path. Simultaneously, the sheet lifting member 832 pivots toward the stack 8130 of slip sheets and releasably secures the next sheet, that is, the new top sheet 8134 in the stack 8130 of slip sheets by applying a vacuum to the suction cups 854. As the sheet placement member 836 releases the sheet 8132 onto the pallet 122 by releasing the vacuum from the suction cups 8112 (FIG. 16H), the sheet lifting member 832 pivots back into the sheet release position. The sheet placement member 836 can then return to the "ready" position shown in FIG. 16A, and the process can repeat once the pallet 122 has been removed from underneath the sheet placement device 104.

In order to facilitate proper control and timing of the components of the sheet placement machine, various sensors are provided, which can provide input to a controller, such as a programmable logic controller or a suitably programmed general purpose computer. In the illustrated embodiment, a programmable logic controller is disposed inside the housing 860 and is operably coupled to the sensors, the sheet lifting member actuator 834, the sheet placement member 836 and the sheet placement member actuator. As shown in FIG. 12, on the side of the sheet placement machine 104 having the motor 898 (FIGS. 15, 15B), a sheet receiving position deceleration sensor 8162A and a sheet receiving position stop sensor 8162B are provided on the guide plate 830 adjacent the driven wheel 8106, and a sheet placement position deceleration sensor 8164A and a sheet placement position stop sensor 8164B are provided on the lower side cross-member 826. The sheet receiving position deceleration sensor 8162A provides a signal for the motor 898 driving the sheet placement member 836 to slow down because it is approaching the sheet receiving position, and the sheet receiving position stop sensor 8162B provides a signal for the motor 898 to stop because the sheet placement member 836 has reached the sheet receiving position. Similarly, the sheet placement position deceleration sensor 8164A provides a signal for the motor 898 to slow down because the sheet placement member 836 is approaching the sheet placement position, and the sheet placement position stop sensor 8164B provides a signal for the motor 898 to stop because the sheet placement member 836 has reached the sheet placement position. The controller can determine whether the sheet lifting member 832 or the sheet placement member 836 have captured a sheet by way of a vacuum sensor, which detects the pressure change when the suction cups 854, 8112, engage the sheet. Where the sheet placement machine 104 forms part of a palletizing system such as palletizing system 100, the controller may communicate and coordinate with the controller of the palletizing system 100, or a single controller may control all multiple components of the palletizing system 100, including the sheet placement machine 104.

Figure 19:
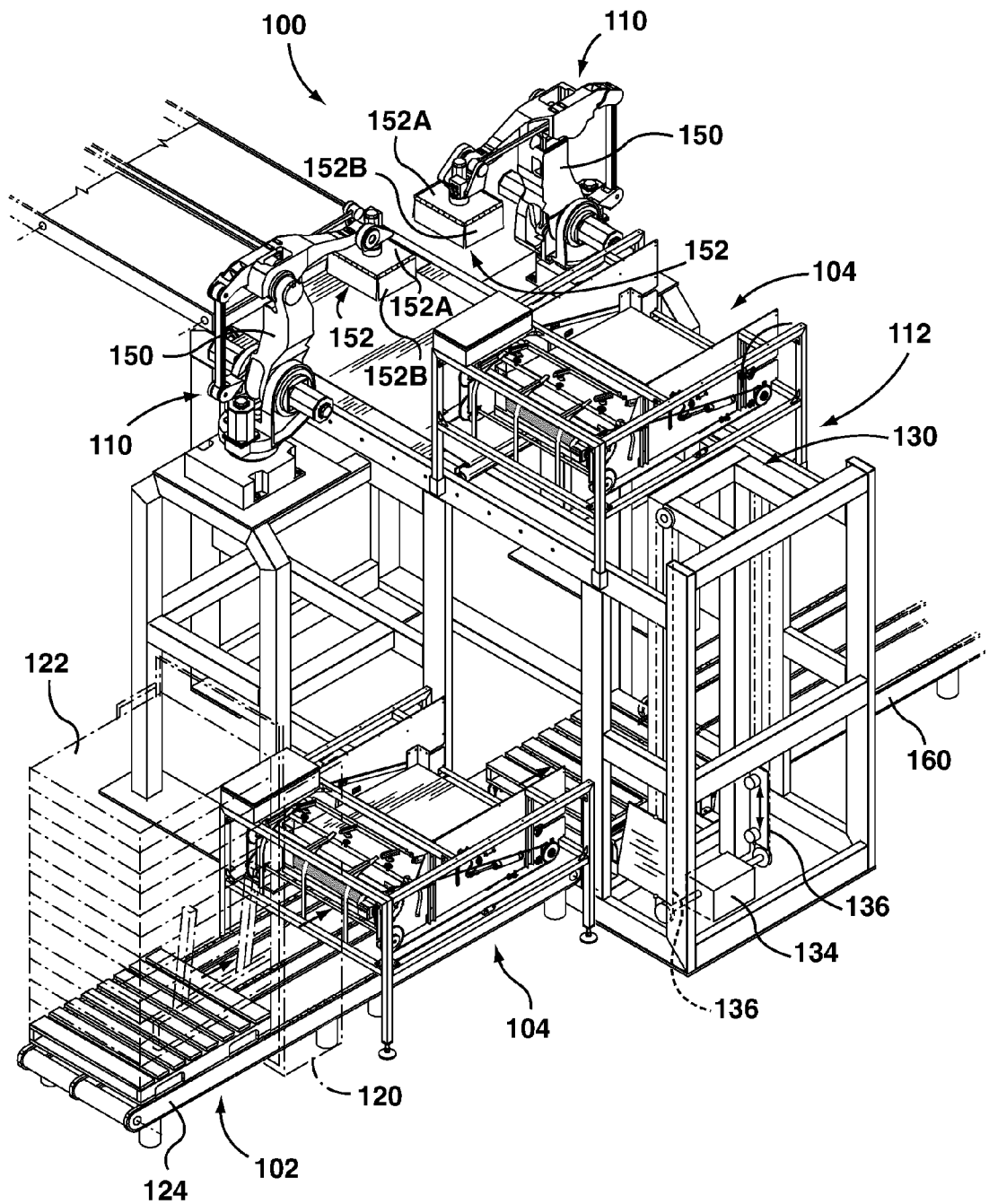
FIG. 19 is a perspective view of a modified version of the palletizing system of FIG. 1, with a second sheet placement machine secured to the primary frame, above the elevator.

In some instances, it may be desirable to increase the stability of a loaded pallet by depositing slip sheets between the layers on the pallet at various intervals. For example, a slip sheet may be placed between each layer, between alternate layers, or at other intervals (e.g. at the halfway point). To accomplish this, a second sheet placement machine 104 may be secured to the primary frame 112 above the elevator 106, as shown in FIG. 19. As such, the second sheet placement machine 104 can deposit a slip sheet on any selected layer of items 114 (not shown in FIG. 19) on the pallet 122.

Figure 20:
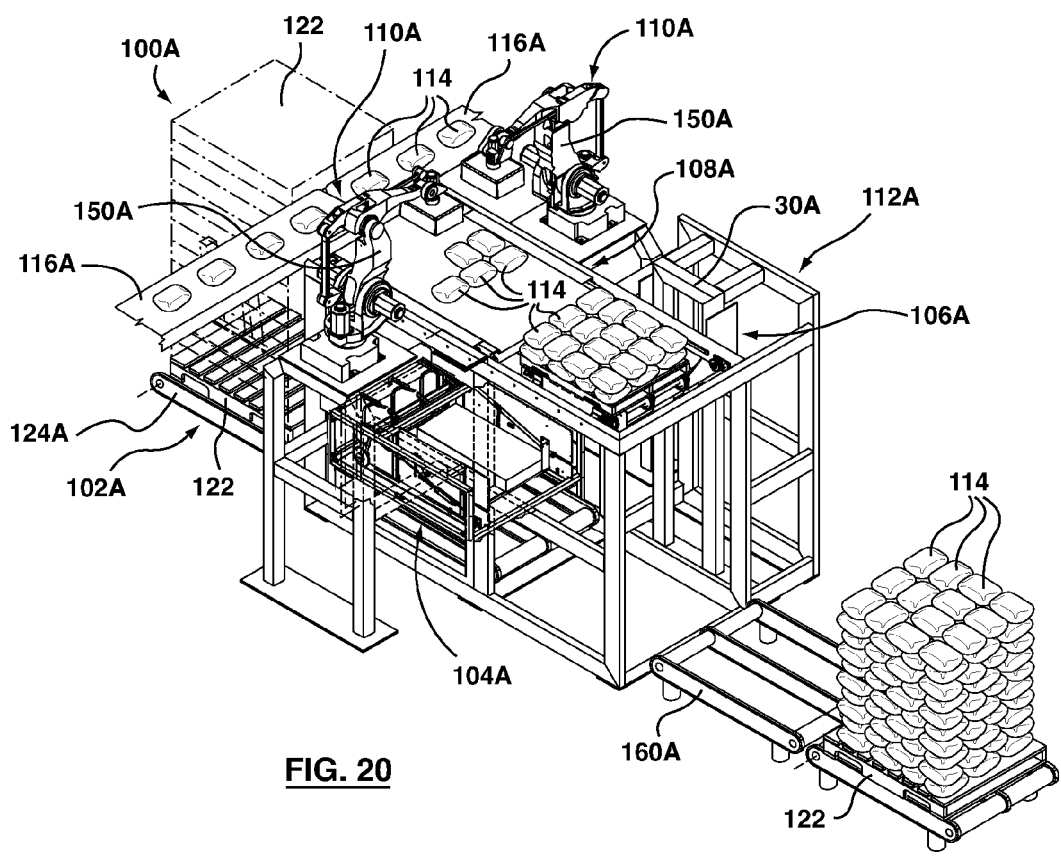
FIG. 20 is a perspective view of a second embodiment of a palletizing system according to aspects of the present invention.

Referring now to FIG. 20, another embodiment of a palletizing system according to aspects of the present invention is shown generally at 100A. This second embodiment 100A is similar in construction to the first embodiment 100, but has a different arrangement of components relative to one another. As such, elements in the palletizing system 100A corresponding to those in the palletizing system 100 are denoted by identical reference numerals except with the suffix "A". Items and pallets continue to be denoted by the reference numerals 114 and 122, respectively.

Figure 21:
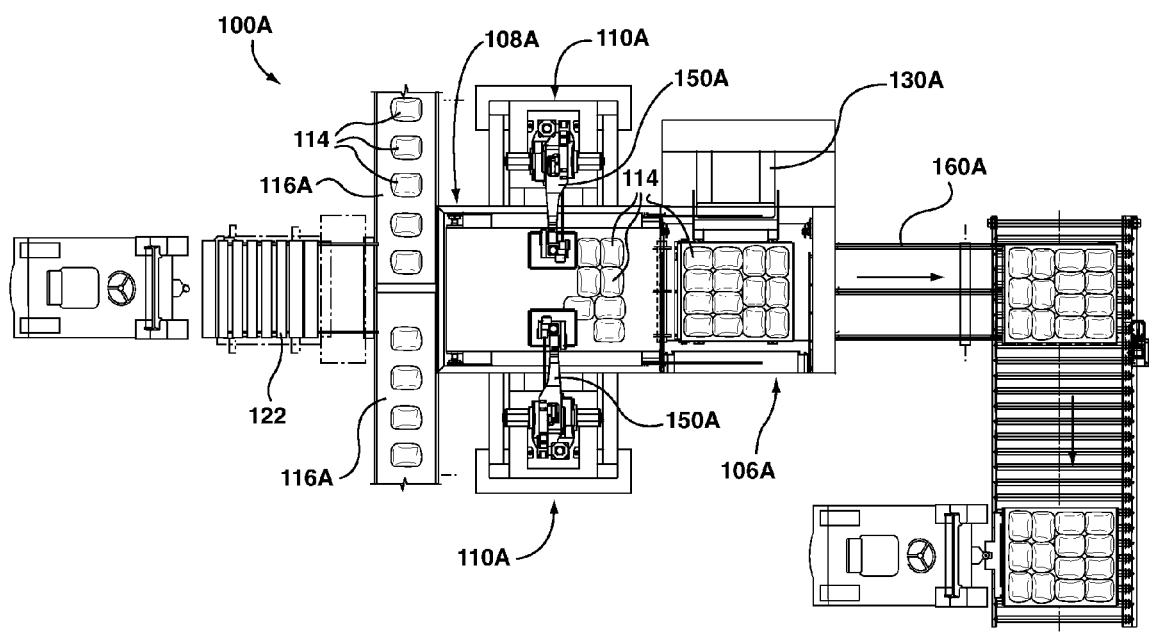
FIG. 21 is a plan view of the palletizing system of FIG. 20, forming part of a larger facility and palletizing items.

In the palletizing system 100A, the sheet placement machine 104A is positioned inside the primary frame 112A, beneath the item-loading conveyor system 108A, with a portion of the pallet feeding conveyor 124A also running inside the primary frame 112A, underneath the sheet placement machine 104A, up to the elevator 106A. FIG. 21A shows an overhead view of a palletizing system 100A in use.

It will be appreciated that in operational installations, protective screens will typically be disposed over many of the outer faces of the primary frame 112, 112A and the sheet placement machine 104, 104A, for personnel safety and protection of the components. These screens are not shown in the figures, simply for ease of illustration.

A plurality of currently preferred embodiments have been described by way of example. It will be apparent to persons skilled in the art that a number of variations and modifications can be made without departing from the scope of the invention as defined in the claims.

What is claimed is:

1. A method of transferring a top sheet from a stack of sheets to a pallet, the method comprising:
lifting the top sheet from the stack of sheets, the stack of sheets contained in an elevated magazine positioned above and substantially in registration with the pallet;
carrying the top sheet in an arcuate path around an edge of the magazine to a sheet placement position beneath the magazine and above the pallet; and
releasing the top sheet onto the pallet in alignment therewith.

2. The method of claim 1, wherein:
the step of lifting the top sheet from the stack of sheets is carried out by a sheet lifting member;
the step of carrying the top sheet in an arcuate path around an edge of the magazine to a position beneath the magazine and above the pallet is carried out by a sheet placement member;
the method further comprising a step of transferring the top sheet from the sheet lifting member to the sheet placement member after lifting the top sheet from the stack of sheets.

3. The method of claim 2, wherein the step of lifting the top sheet from the stack of sheets comprises:
moving the sheet lifting member from a sheet release position spaced from the top of the stack of sheets to a sheet capture position at the top of the stack of sheets:
releasably securing the top sheet to the sheet lifting member; and
moving the sheet lifting member to the sheet release position.

4. The method of claim 3, wherein the step of carrying the top sheet in an arcuate path around an edge of the magazine to the sheet placement position beneath the magazine and above the pallet comprises:
releasably securing the top sheet to the sheet placement member; and moving the sheet placement member from a sheet receiving position opposed to and beneath the sheet lifting member and the sheet when the sheet lifting member is in the sheet release position, to the sheet placement position.

5. The method of claim 4, wherein:

the step of releasably securing the top sheet to the sheet lifting member comprises releasably securing the top sheet to the sheet lifting member by suction;

the step of releasably securing the top sheet to the sheet placement member comprises releasably securing the top sheet to the sheet placement member by suction; and the step of transferring the top sheet from the sheet lifting member to the sheet placement member after lifting the top sheet from the stack of sheets comprises activating suction on the sheet placement member and releasing suction on the sheet lifting member.

6. A sheet placement apparatus for placing sheets on a pallet, comprising:

a support structure, the support structure comprising:
a sheet stack magazine;
a frame for elevating the magazine to define a pallet receiving region beneath the magazine;

a sheet lifting mechanism carried by the support structure;

a sheet placement mechanism carried by the support structure;

the sheet lifting mechanism including:
a sheet lifting member movable to, when a stack of sheets is contained in the magazine, capture a top sheet on the stack of sheets, lift the sheet from the stack of sheets and release the sheet to the sheet placement mechanism; and
a sheet lifting member actuator for moving the sheet lifting member;

the sheet placement mechanism including:
a sheet placement member movable to, when a stack of sheets is contained in the magazine, receive and capture the sheet from the sheet lifting member, carry the sheet in an arcuate path around an edge of the magazine to a position beneath the magazine and above the pallet receiving region, and, when a pallet is received in the pallet receiving region, release the sheet onto the pallet in alignment therewith; and a sheet placement member actuator for moving the sheet placement member;

whereby the sheet lifting mechanism and the sheet placement mechanism cooperate to, when a stack of sheets is contained in the magazine and a pallet is received in the pallet receiving region, transfer the top sheet from the stack of sheets to the pallet.

7. A sheet placement apparatus for placing sheets on a pallet, comprising:

a support structure, the support structure comprising:
a sheet stack magazine;
a frame for elevating the magazine to define a pallet receiving region beneath the magazine;

a sheet lifting member movably mounted to the support structure to be movable between a sheet release position and a bottom sheet capture position through a range of intermediate sheet capture positions and having a sheet lifting member capturer for releasably securing a sheet to the sheet lifting member;

a sheet lifting member actuator coupled to the sheet lifting member for controlling movement thereof;

a sheet placement member movably mounted to the support structure to be movable between a sheet receiving position opposed to and beneath the sheet lifting member when the sheet lifting member is in the sheet release position to a sheet placement position between the magazine and the pallet receiving region in which a sheet carried by the sheet placement member is aligned with the pallet receiving region, the sheet placement member having a sheet placement member capturer for releasably securing a sheet to the sheet placement member;

a sheet placement member actuator coupled to the sheet placement member for reciprocating the sheet placement member between the sheet receiving position and the sheet release position;

the sheet lifting member, sheet lifting member actuator, the sheet placement member and the sheet placement member actuator being cooperable to, when a stack of sheets is contained in the magazine and a pallet is received in the pallet receiving region, transfer the top sheet from the stack of sheets to the pallet.

* * * * *